(12) United States Patent
Hankawa et al.

(10) Patent No.: US 6,433,940 B1
(45) Date of Patent: Aug. 13, 2002

(54) ZOOM OPTICAL SYSTEM

(75) Inventors: Masashi Hankawa; Kazuteru Kawamura; Masaru Morooka, all of Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/840,453

(22) Filed: Apr. 24, 2001

(30) Foreign Application Priority Data

Apr. 24, 2000 (JP) ......................................... 2000-122096

(51) Int. Cl.[7] ............................................... G02B 15/14
(52) U.S. Cl. ........................ 359/689; 359/683; 359/686; 359/716
(58) Field of Search ................................. 359/689, 686, 359/683, 684, 716, 740, 791

(56) References Cited

U.S. PATENT DOCUMENTS

| | | | | |
|---|---|---|---|---|
| 5,216,547 A | * | 6/1993 | Ogata ........................ | 359/689 |
| 5,218,478 A | * | 6/1993 | Itoh .......................... | 359/692 |
| 5,528,429 A | * | 6/1996 | Hagimori ................... | 359/689 |
| 5,606,460 A | * | 2/1997 | Ohtake ....................... | 359/689 |
| 5,815,320 A | * | 9/1998 | Hoshi et al. ................ | 359/683 |
| 6,061,187 A | * | 5/2000 | Kang ......................... | 359/689 |
| 6,185,049 B1 | * | 2/2001 | Terada et al. ............... | 359/689 |
| 6,204,968 B1 | * | 3/2001 | Hayashi ..................... | 359/554 |
| 6,236,522 B1 | * | 5/2001 | Shimizu ..................... | 359/686 |
| 6,307,684 B1 | * | 10/2001 | Iyama ....................... | 359/676 |

FOREIGN PATENT DOCUMENTS

| | | |
|---|---|---|
| JP | 08-152559 | 6/1996 |
| JP | 08262325 | 10/1996 |
| JP | 09033813 A | 2/1997 |
| JP | 09-090225 | 4/1997 |
| JP | 09120028 A | 5/1997 |
| JP | 09-179025 | 7/1997 |
| JP | 11-052232 | 2/1999 |
| JP | 11-119098 | 4/1999 |
| JP | 11183801 A | 7/1999 |

* cited by examiner

*Primary Examiner*—Evelyn A Lester
(74) *Attorney, Agent, or Firm*—Pillsbury Winthrop LLP

(57) ABSTRACT

A zoom optical system comprising, in order from the object side, a first lens unit having positive refractive power, a second lens unit having positive refractive power and a third lens unit having negative refractive power, and configured to change a magnification from a wide position to a tele position by moving the lens units on the object side so as to widen an airspace between the first lens unit and the second lens unit and narrow an airspace between the second lens unit and the third lens unit, thereby having a short total length at the tele position in particular and favorable optical performance.

20 Claims, 16 Drawing Sheets

FIG. 1
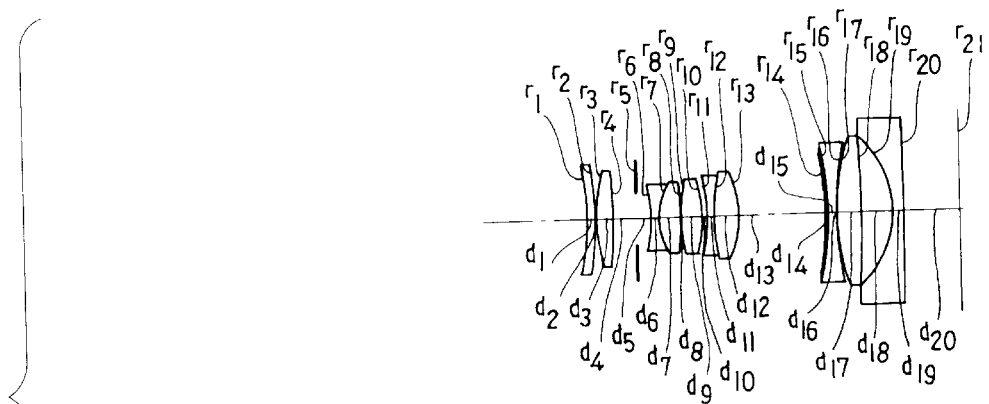
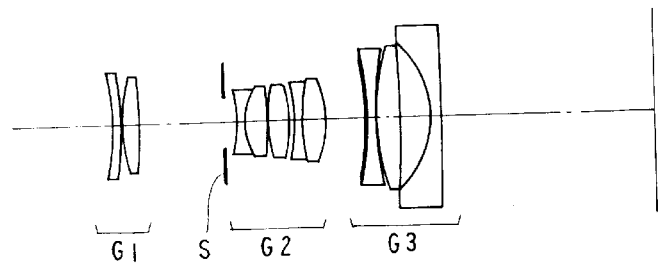
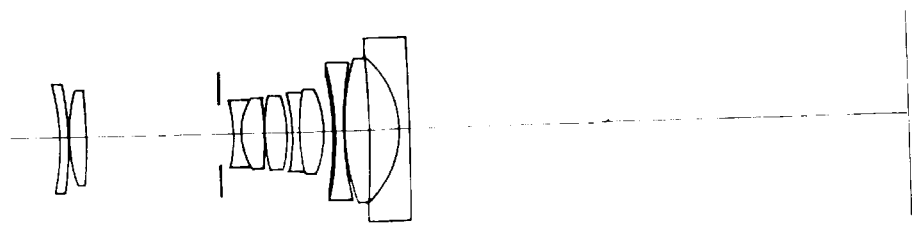

FIG. 4
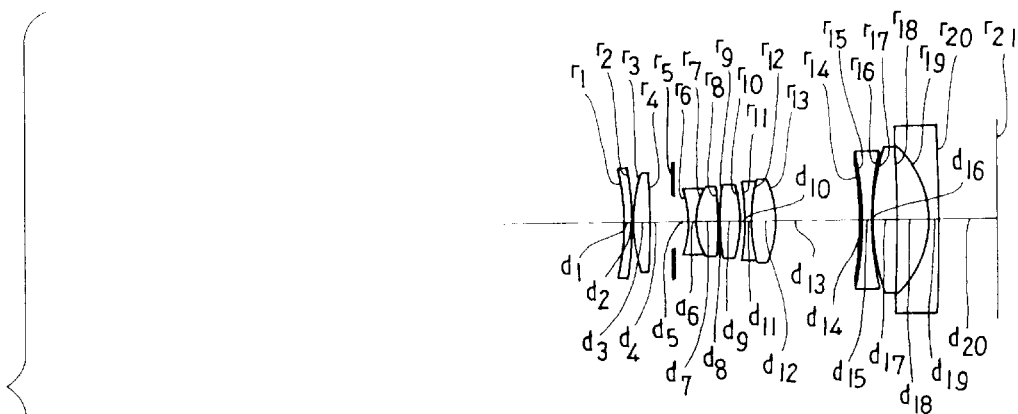
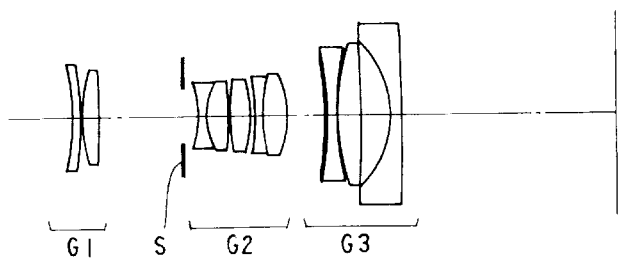
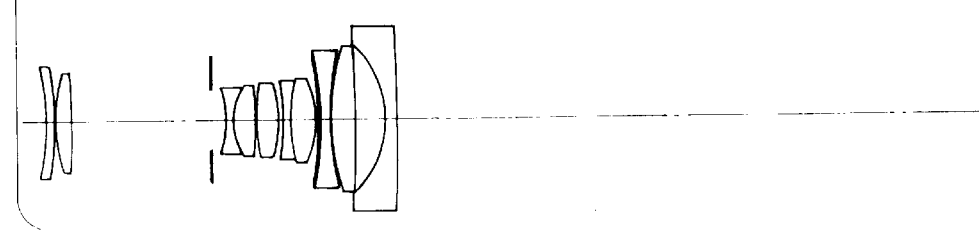

FIG. 5
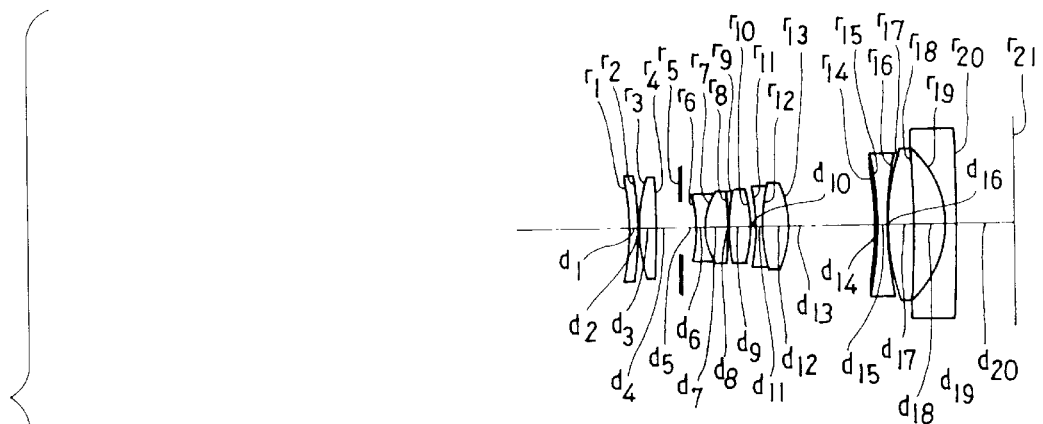
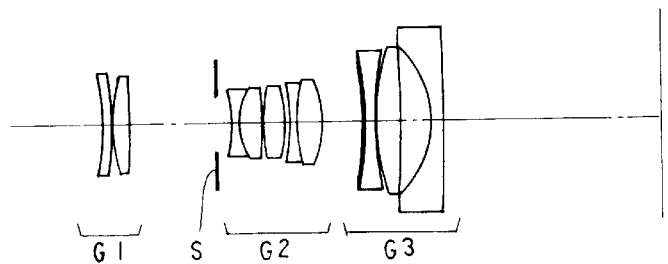
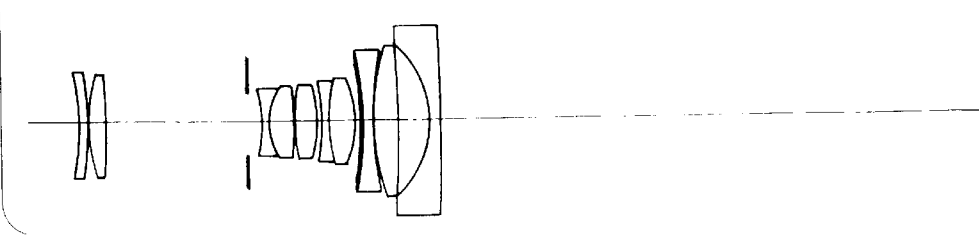

FIG. 6
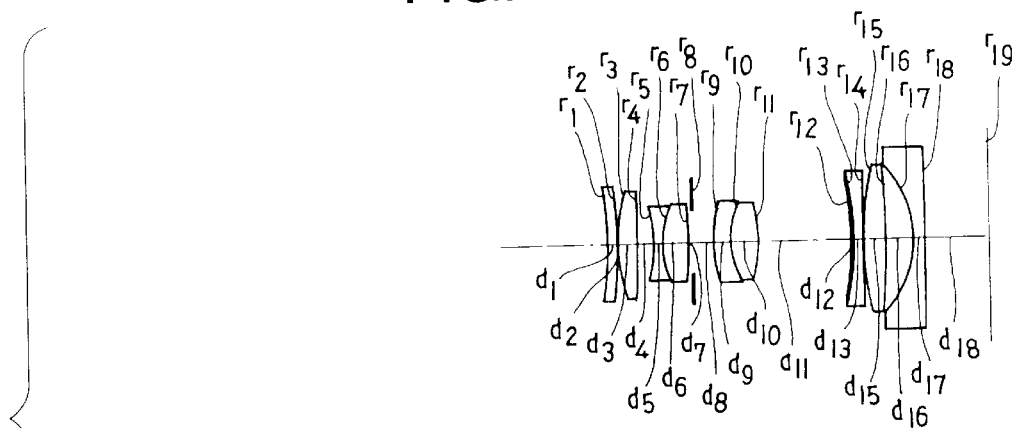
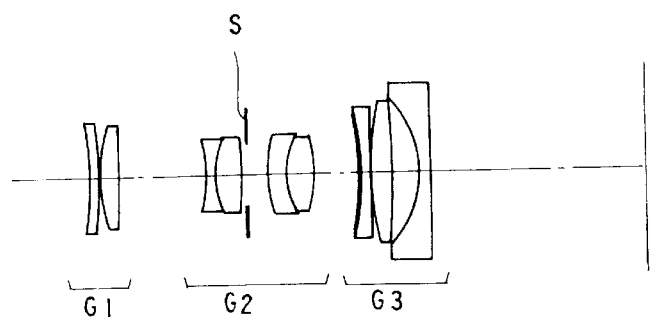
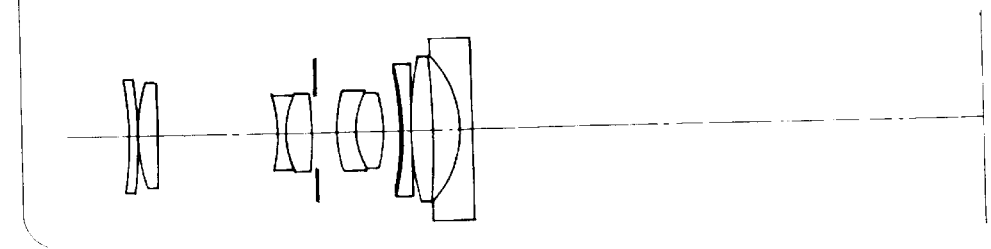

ZOOM OPTICAL SYSTEM a) FIELD OF THE INVENTION

The present invention relates to a zoom optical system for photographic cameras, and more specifically a zoom optical system for lens shutter cameras in particular.

b) DESCRIPTION OF THE PRIOR ART

Lens shutter cameras have generally used zoom lens systems in recent years and demands are increasing in particular for lens systems which have vari-focal ratios of 3 and higher. On the other hand, demands are increasing for compact and inexpensive lens systems.

Out of various types zoom lens systems for lens shutter cameras which are known as those having-vari-focal ratios of 3 and higher in particular, there are known many zoom lens systems each composed of three lens units having a positive-positive-negative refractive power distribution. The zoom lens system which is composed of the three lens units consists in order from the object side, for example, of a first lens unit having positive refractive power, a second lens unit having positive refractive power and a third lens unit having negative refractive power, and is configured for zooming from a wide position to a tele position by moving the lens units so as to widen an airspace between the first lens unit and the second lens unit and narrow an airspace between the second lens unit and the third lens unit.

An conventional examples of such a zoom lens system as that described above, there are known zoom lens system which are disclosed by Japanese Patents Kokai Publication No. Hei 11-183801, No. Hei 11-119098, No. Hei 11-52232, No. Hei 9-179025, No. Hei-9-120028, No. Hei 9-90225 and No. Hei 8-262325. These conventional examples have large total lengths at tele positions, thereby requiring complicated and large lens barrels.

Furthermore, a zoom lens system disclosed by Japanese Patent Kokai Publication No. Hei 9-33813 has a high telephoto ratio, thereby hardly allowing cameras to be configured compact.

Furthermore, a zoom lens system disclosed by Japanese Patent Kokai Publication No. Hei 8-152559 requires high precisions for airspaces and the like, thereby being hardly manufactured.

SUMMARY OF THE INVENTION

An object of the present invention is to provide a zoom lens system comprising, in order from the object side, a first lens unit having positive refractive power, a second lens unit having positive refractive power and a third lens unit having negative refractive power, and configured to change a magnification from a wide position to a tele position by moving the lens units on the object side so as to widen an airspace between the first lens unit and the second lens unit and narrow an airspace between the second lens unit and the third lens unit, and satisfy the following conditions (1), (2), (3) and (4):

$$fT/fW > 3.8 \tag{1}$$

$$0 < [S(fTa) \cdot S(fW)]/(fTa-fW) < 0.2 \tag{2}$$

$$0.8 < L(fTa)/(fTa-fW) < 0.2 \tag{3}$$

$$0 < H(G1)/fTa < 0.023 \tag{4}$$

Another object of the present invention is to provide a zoom optical system comprising, in order from the object side, a first lens unit having positive refractive power, a second lens unit having positive refractive power and a third lens unit having negative refractive power, and configured to change a magnification from a wide position to a tele position by moving the lens units on the object side so as to widen an airspace between the first positive lens unit and the second lens unit and narrow an airspace between the second lens unit and the third lens unit, wherein the first lens unit consists of, in order from the object side, a negative meniscus lens element which has a concave surface on the object side and a positive lens element which has an object side surface having curvature higher than that of an image side surface, and wherein the third negative lens unit comprises, in order from the object side, a biconcave lens element, positive lens component which has an object side surface having curvature higher than that of an image side surface and a negative lens component which has curvature on an object side concave surface higher than that on an image side surface, and satisfies the following conditions (2A) and (3A):

$$0 < [S(fT) - S(fW)]/(fT-fW) < 0.2 \tag{2A}$$

$$0.8 < L(fT)/(fT-fW) < 1.05 \tag{3A}$$

Still another object of the present invention is to provide a zoom optical system comprising, in order from the object side, a first lens unit having positive refractive power, a second lens unit having positive refractive power and a third lens unit having negative refractive power, and configured to change a magnification from a wide position to a tele position by moving the lens units on the object side so as to widen an airspace between the first lens unit and the second lens unit and narrow an airspace between the second lens unit and the third lens unit, wherein the third negative lens unit comprises, in order from the object side, a biconcave lens component, a positive lens component which has an object side surface having curvature higher than that of an image side surface and a negative lens component which has an object side concave surface having curvature higher than that of an image side surface, wherein at least an airspace between the second lens unit and the third lens unit is changed for focusing, and wherein the zoom optical system satisfies the following condition (10):

$$(\beta 3T)^2/[F(T) \times 0.03] < 60 \tag{10}$$

Still another object of the present invention is to provide an optical system comprising, in order from the object side, a first lens unit having positive refractive power, a second lens unit having positive refractive power and a third lens unit having negative refractive power, and configured to change a magnification from a wide position to a tele position by moving the lens unit on the object side so as to widen an airspace between the first lens unit and the second lens unit and narrow an airspace between the second lens unit and the third lens unit, change the airspace between the second lens unit and the third lens unit for focusing, and satisfies the following conditions (1), (4), (5) and (6):

$$fT/fW > 3.8 \tag{1}$$

$$0 < H(G1)/fTa < 0.023 \tag{4}$$

$$15 < (\beta 3T)^2 - (\beta 3T)^2 \times (\beta 2T)^2 < 27 \tag{5}$$

$$0.3 < f1/fTa < 0.5 \tag{6}$$

BRIEF DESCRIPTION OF THE DRAWINGS

FIGS. 1 through 12 are sectional views showing compositions of first through twelfth embodiments of the present invention;

DETAILED DESCRIPTION OF THE PREFERRED EMBODIMENTS

Figure 2:
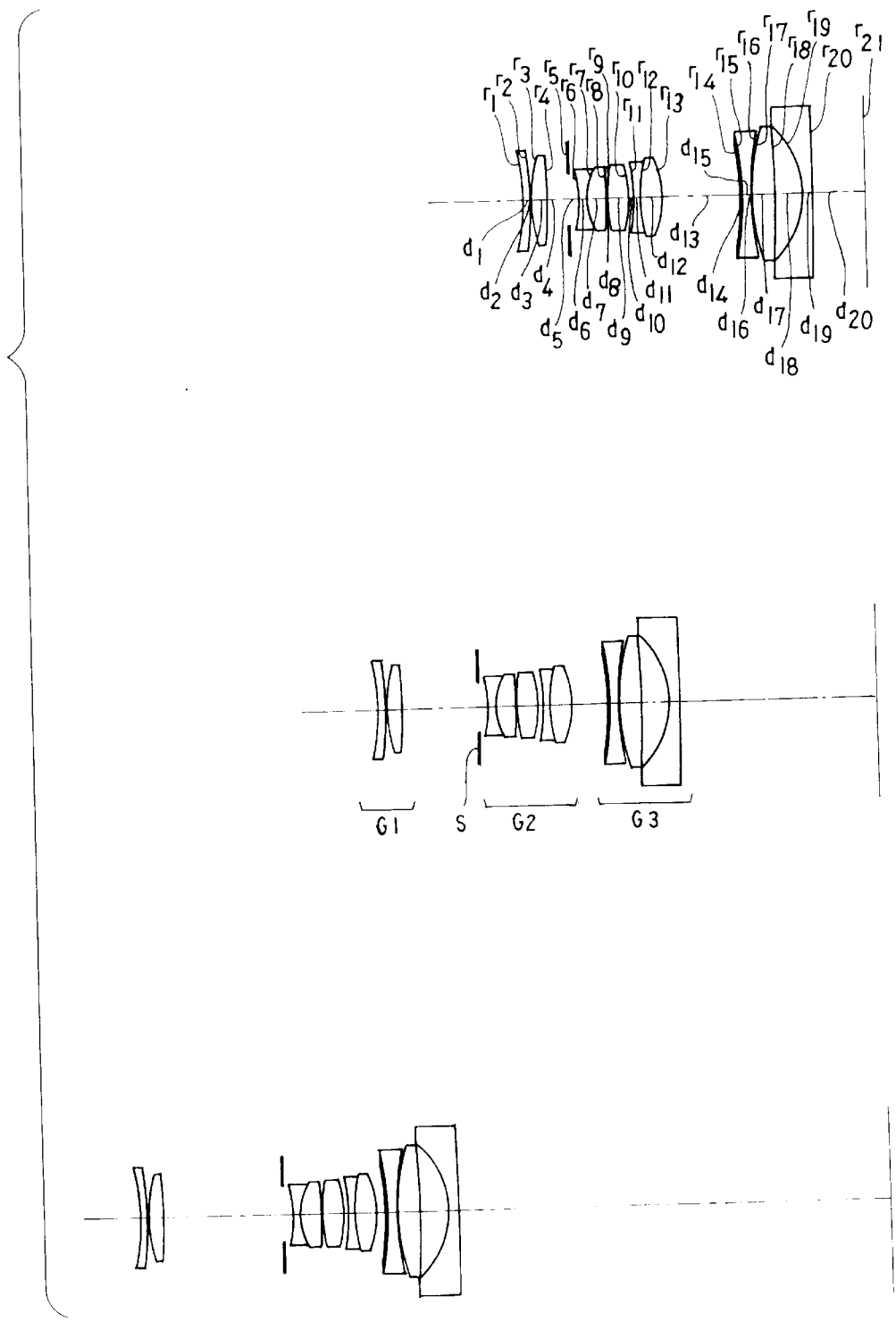
Figure 3:
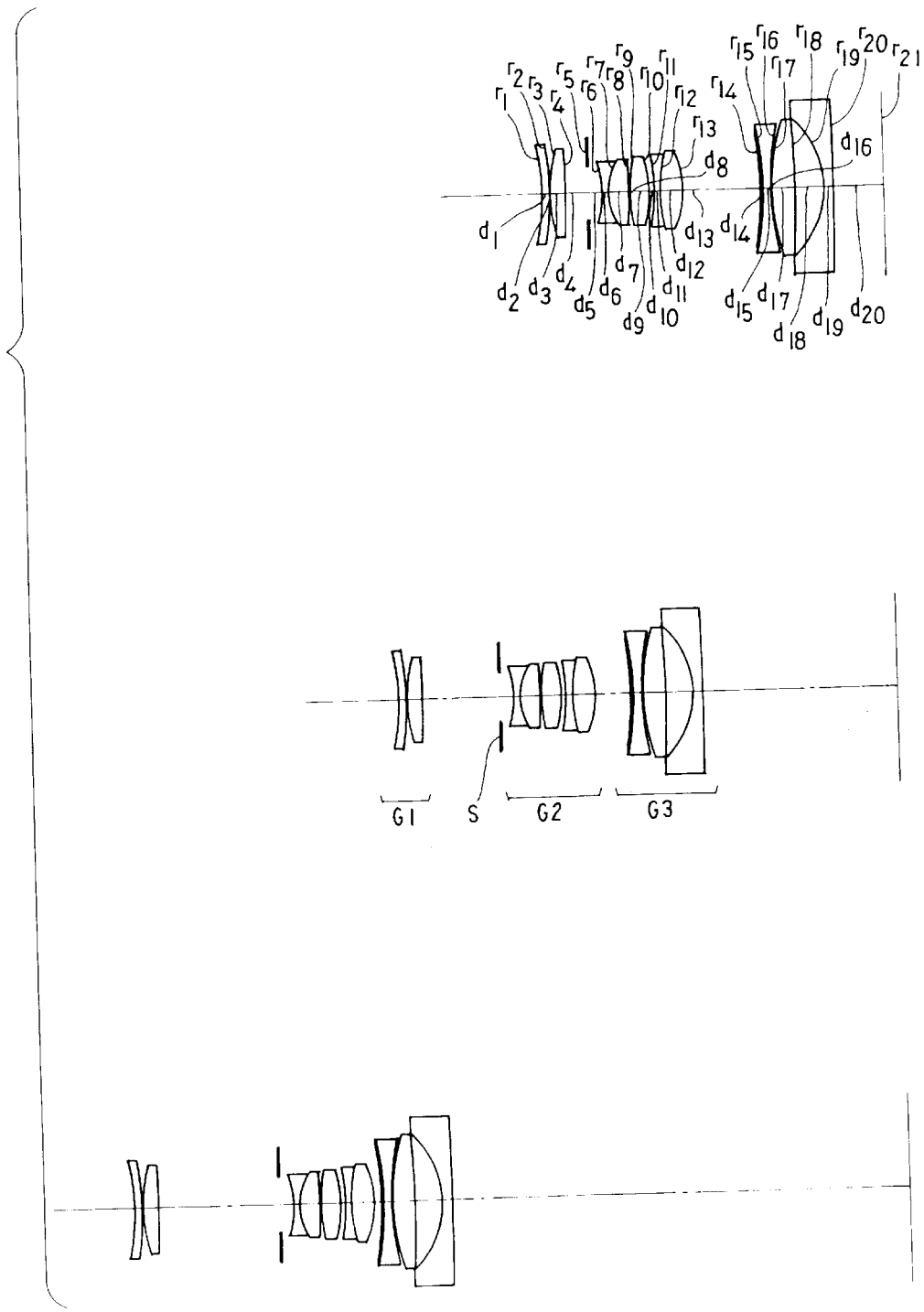

A zoom optical system according to the present invention (zoom optical system having a first composition) is characterized by comprising, in order from the object side, a first lens unit G1 having positive refractive power, a second lens unit G2 having positive refractive power and a third lens unit G3 having negative refractive power, for example, as shown in FIG. 1, changing a magnification from a wide position to a tele position by moving the lens units G1, G2 and G3 on the object side so as to widen an airspace between the first lens unit and the second lens unit and narrow an airspace between the second lens unit and the third lens unit, and satisfying the following conditions (1), (2), (3) and (4):

$$fT/fW > 3.8 \quad (1)$$

$$0 < [S(fTa) - S(fW)]/(fTa - FW) < 0.2 \quad (2)$$

$$0.8 < L(FtA)/(FtA - Fw) < 1.05 \quad (3)$$

$$0 < H(g1)/fTa < 0.023 \quad (4)$$

wherein reference symbols fT and FW represent focal length of the zoom optical system at the wide position and the tele position respectively, a reference symbol fTa designates an optical focal length in a focal length region exceeding 3.8 times of the focal length at the wide position, a reference symbol S(w) denotes a distance as measured from a most object side surface to a most image side surface at the wide position, a reference symbol S(fTa) represents a distance as measured from a most object side surface to a most image side surface at the focal length of fTa, a reference symbol L(fTa) designates a distance as measured from the most object side surface to the most image side surface at the focal length of fTa and a reference symbol H(G1) denotes a distance as measured from the most object side surface to a front principal point of the first lens unit G1.

In order to obtain a high vari-focal ratio, the zoom optical system according to the present invention is configured comprise the first positive lens unit G1, the second positive lens unit G2 and the third negative lens unit G3, and change the magnification from the wide position to the tele position by moving all the lens units G1, G2 and G3 on the object side so as to widen the airspace between the first lens unit G1 and the second lens unit G2 and narrow the airspace between the second lens unit G2 and the third lens unit G3.

For a reason which is described next, the zoom optical system according to the present invention is configured to satisfy the above mentioned conditions (1), (2), (3) and (4).

The condition (1) defines a zoom ratio of the zoom optical system according to the present invention and if a lower limit of 3.8 of this condition is exceeded, it will be impossible to obtain the object zoom optical system which has a high vari-focal ration.

If the condition (1) is not satisfied, a denominator (fTa−fW) will have a small value in the conditions (2) and (3) and it will be difficult to compose a lens system so as to satisfy these conditions.

The condition (2) defines a ratio of a variation amount of a distance as measured from a first surface (a most object side surface) of the optical system to a final surface (a most image side surface) caused by changing a focal length from fW to fTa for zooming relative to a variation amount of a focal length of the optical system as a whole caused by changing the focal length from fW to fTa for zooming and if a lower limit 0 of the condition (2) is exceeded, a correction sensitivity of a back focal position to a positional deviation of a lens surface in a direction of an optical axis will be high that is, a deviation of the lens surface in the direction of the optical axis will result in a large positional deviation of the back focal position, whereby imaging performance will tend to be easily lowered. If an upper limit of 0.2 of the condition (2) is exceeded, in contrast, each lens unit will have a weak power, thereby making it difficult to obtain a required vari-focal ratio when the optical system is configured so as to have a short total length. Furthermore, when the optical system is to be focused by moving some of the lens units in a direction along the optical axis, the lens units must be moved for long distances, thereby making it impossible to focus the optical system on an object located at an extremely short distance.

It is more desirable to satisfy, in place of the condition (2), the following condition (2-1) which has an upper limit of 0.07.

$$0 < [S(fTa) - S(fW)]/(fTa - fW) < 0.07 \quad (2-1)$$

The condition (3) defines a ratio of a total length of the optical system in a telephoto condition (at the focal length fTa) relative to a variation amount of a focal length of the optical system as a whole (a variation amount of the focal length from the wide position to the focal length fTa) and if a lower limit of 0.8 of the condition (3) is exceeded, optical performance will be remarkably lowered due to remarkable variation of spherical aberration, coma and longitudinal chromatic aberration and the like which are caused by zooming. If an upper limit of 1.05 of the condition (3) is exceeded, a telephoto ratio [L(fTa)/fTa] will be enhanced, thereby making it impossible to shorten a total length of the optical system.

It is more desirable to satisfy, in place of the above-mentioned condition (3), the following condition (3-1) which has an upper limit of 1.04 and a lower limit of 0.9:

$$0.9 < L(fTa)/(fTa - fW) < 1.04 \quad (3-1)$$

The condition (4) defines a ratio of the distance [H(G1)] as measured from the most object side surface to the front principal point of the first lens unit G1 relative to the focal length (fTa) of the optical system as a whole in the telephoto condition. If a lower limit of 0 of the condition (4) is exceeded, the telephoto ratio L(fTa)/fTa will be enhanced, thereby making it impossible to configure the optical system compact by shortening its total length. If an upper limit of 0.023 is exceeded, aberrations, distortion in particular, will be overcorrected.

It is more desirable to satisfy, in place of the condition (4), the following condition (4-1) which as a lower limit of 0.01 and an upper limit of 0.02.

$$0.01 < H(G1)/fTa < 0.02 \quad (4-1)$$

A zoom optical system which has a second composition according to the present invention is an optical system comprising, in order from the object side, a first lens unit G1 having positive refractive power, a second lens unit G2 having positive refractive power and a third lens unit G3 having negative refractive power, and configured to change a magnification from a wide position to a tele position by moving the lens unit on the object side so as to widen an airspace between the first lens unit G1 and the second lens unit G2 and narrow an airspace between the second lens unit G2 and the third lens unit G3, wherein the first lens unit G1 having the positive refractive power consists of two lens elements, in order from the object side, a negative meniscus lens element having a concave surface on the object side and a positive lens element which has curvature on an object side surface higher than that on an image side surface, and the third negative lens unit G3 having the negative refractive power comprises, in order from the object side, a negative biconcave lens element, a positive lens element which has curvature on an object side convex surface higher than that on an image side surface and a negative lens element which has curvature on an object side concave surface higher than that on an image side surface, and the zoom optical system satisfies the following conditions (2A) and (3A):

$$0 < [S(fT) - S(fW)]/(fT - fW) < 0.2 \quad (2A)$$

$$0.8 < L(fT)/(fT - fW) < 1.05 \quad (3A)$$

wherein reference symbols fW and fT represent focal lengths of the zoom optical system as a whole at the wide position and the tele position respectively, a reference symbol S(fW) designates a distance as measured from a most object side surface to a most image side surface at the wide position, a reference symbol S(fT) denotes a distance as measured from the most object side surface to the most image side surface at the tele position and a reference symbol L(fT) denotes a total length of the optical system at the tele position.

The zoom optical system which has the second composition comprises the three lens units, and is configured for a power distribution among the lens units and movements of the lens units which are substantially the same as those of the optical system which has the above described first composition. That is, the zoom optical system which has the second composition is an optical system comprising, in order from the object side, a first lens unit G1 having positive refractive power, a second lens unit G2 having positive refractive power and a third lens unit G3 having negative refractive power, and configured for zooming from a wide position to a tele position by moving the lens units so as to widen an airspace between the first lens unit G1 and the second lens unit G2 and narrow an airspace between the second lens unit G2 and the third lens unit G3.

Like the first composition, the above described second composition also makes it possible to obtain a zoom optical system which has a high vari-focal ratio.

Furthermore, the first lens unit G1 of the zoom optical system which has the second composition according to the present invention consists of two lens elements, in order from the object side, a negative meniscus lens element which has an object side concave surface and a positive lens element which has curvature on an object side surface higher than that on an image side surface so that a lens system as a whole has a short total length and can favorably correct aberrations, curvature of field and astigmatism in particular.

Furthermore, the third lens unit is configured so as to comprise, in order from the object side, a biconcave lens element, a positive lens element which has curvature on an object side convex surface higher than that on an image side and a negative lens element which has curvature on an object side concave surface higher than that on an image side surface so that aberrations, curvature of field and astigmatism in particular, can be corrected favorably.

Furthermore, the zoom optical system which has the second composition is characterized by satisfying the above-mentioned conditions (2A) and (3A).

The condition (2A) defines a ratio of a variation amount of the distance from the first surface to the final surface between the wide position and the tele position relative to a variation amount of a focal length from the wide position to the tele position, and if a lower limit of the condition (2A) is exceeded, a correction sensitivity of the back focal position to a positional deviation of a lens surface in the direction of the optical axis will be high, whereby imaging performance tends to be easily lowered.

If an upper limit of the condition (2A) is exceeded, each lens unit will have a weak power, thereby making it difficult to obtain a high vari-focal ratio when the optical system is to be configured so as to have a short total length. When some of the lens units are to be moved for focusing, the lens units must be moved for long distances, whereby the optical system cannot be focused on an object located at an extremely short distance.

Furthermore, the condition (3A) defines a ratio of a total length of the optical system at the tele position relative to a variation amount of the focal length from the wide position to the tele position and if a lower limit of 0.8 of the condition (3A) is exceeded, spherical aberration, coma and longitudinal chromatic aberration will be varied remarkably by zooming. If an upper limit of 1.05 is exceeded, in contrast, a telephoto ratio will be enhanced, thereby making it difficult to shorten a total length of the optical system.

Owing to the first lens unit G1 and the third lens unit G3 which are configured as described above, the optical system having the second composition can be a compact optical system having a high vari-focal ratio without defining the condition (1). When the optical system is configured so as to satisfy the conditions (2A) and (3A) in place of the conditions (2) and (3) in particular, the optical system can be compact, have a high vari-focal ratio, correct aberrations favorably and exhibit excellent optical performance without satisfying the condition (4).

A zoom optical system which has a third composition according to the present invention is an optical system comprising, in order from the object side, a first lens unit having positive refractive power, a second lens unit having positive refractive power and a third lens unit having negative refractive power, and configured to change a magnification from a wide position to a tele position by moving the lens units on the object side so as to widen an airspace between the first lens unit and the second lens unit and narrow an airspace between the second lens unit and the third lens unit, wherein the third lens unit having the negative refractive power comprises, in order from the object side, a biconvex lens element, a positive lens element which has curvature on an object side convex lens element higher than that on an image side surface and a negative lens element which has a curvature on an object side concave lens element higher than that on an image side surface, at least the airspace between the second lens unit and the third lens unit is varied for focusing, and the zoom optical system satisfies the following condition (10):

$$(\beta 3T)^2/[F(T) \times 0.03] < 60 \quad (10)$$

wherein a reference symbol $\beta 3T$ represents a magnification of the third lens unit at the tele position and a reference symbol F (T) designates an F number at the tele position.

In order to obtain a high vari-focal ratio, the zoom optical system having the third composition is configured for a power distribution among the lens units and movements of the movable lens units for zooming which are similar to those of the optical systems having the above described first and second compositions. That is, the zoom optical system having the third composition comprises, in order from the object side, a first lens unit G1 having positive refractive power, a second lens unit G2 having positive refractive power and a third lens unit G3 having negative refractive power, and is configured to perform zooming by moving the lens units on the object side so as to widen an airspace between the first lens unit G1 and the second lens unit G2 and narrow an airspace between the second lens unit G2 and the third lens unit G3.

By configuring the above described third lens unit G3 having the negative refractive power so as to comprise, in order from the object side, a biconcave lens element, the positive lens element which has the curvature on the object side convex surface higher than that on the image side surface and the negative lens element which has the curvature on the object side concave surface higher than that on the image side surface, the optical system having the third composition corrects aberrations, curvature of field and astigmatism in particular.

A lens system which consists of, in order from the object side, a first positive lens unit G1, a second positive lens unit G2 and a third negative lens unit G3 like the zoom optical system according to the present invention has optical performance which is lowered due to an eccentric error of the first lens unit G1 at a tele position in particular. Accordingly, the optical system having the above described third composition is configured to suppress an eccentric error of the first lens unit G1 to a low level by varying the airspace between the second lens unit G2 and the third lens unit G3 for focusing, thereby shortening a moving distance of the first lens unit G1 or keeping this lens unit stationary for focusing.

Furthermore, the condition (10) defines a ratio of a square of the magnification β3T of the third lens unit G3 at the tele position relative to a depth of field. If an upper limit of 60 of this condition is exceeded, a precision will be strict for a variation of the airspace between the second lens unit and the third lens unit.

Furthermore, a zoom optical system having a fourth composition according to the present invention is an optical system comprising, in order from the object side, a first lens unit G1 having positive refractive power, a second lens unit G2 having positive refractive power and a third lens unit having negative refractive power, and configured to change a magnification from a wide position to a tele position by moving the lens units on the object side so as to widen an airspace between the first lens unit G1 and the second lens unit G2 and narrow an airspace between the second lens unit G2 and the third lens unit G3, wherein the airspace between the second lens unit and the third lens unit is varied for focusing and the optical system satisfies the following conditions (1), (4), (5) and (6):

$$fT/fW > 3.8 \quad (1)$$

$$0 < H(G1)/fTa < 0.023 \quad (4)$$

$$15 < (\beta 3T)^2 - (\beta 3T)^2 \times (\beta 2T)^2 < 27 \quad (5)$$

$$0.3 < f1/fTa < 0.5 \quad (6)$$

wherein reference symbols fW and fT represent focal lengths of the optical system as a whole at the wide position and the tele position respectively, a reference symbol fTa designates an optional focal length in a focal length region exceeding 3.8 times of a focal length at the wide position, a reference symbol H (G1) denotes a distance as measured from a first surface to a front principal point of the first lens unit, a reference symbol f1 represents a focal length of the first lens unit, and reference symbols β2T and β3T designate magnifications of the second lens unit and the third lens unit respectively at the tele position.

In order to have a high vari-focal ratio like the optical system having the first through third compositions, the optical system having this fourth composition comprises, in order from the object side, a first positive lens unit G1, a second positive lens unit G2 and a third negative lens unit G3, and is configured to perform zooming from a wide position to a tele position by moving the lens unit G1, G2 and G3 on the object side so as to widen an airspace between the first lens unit G1 and the second lens unit G2 and narrow an airspace between the second lens unit G2 and the third lens unit G3.

Furthermore, the fourth composition is configured to perform focusing by varying at least the airspace between the second lens unit G2 and the third lens unit G3, thereby moving the first lens unit G1 for a short distance or keeping this lens unit stationary for focusing to prevent optical performance of the optical system from being lowered due to an eccentric error of the first lens unit G1.

Furthermore, the zoom optical system having the fourth composition according to the present invention satisfies the above-mentioned conditions (1), (4), (5) and (6).

The condition (1) defines a zoom ratio of the optical system and if a lower limit of the condition (1) is exceeded, it will be impossible to configure the zoom optical system so as to have a high vari-focal ratio.

The condition (4) defines a ratio of the distance H (1G) as measured from the first surface (most object side surface) of the first lens unit G1 to the front principal point thereof relative to the focal length fTA in the region on a side of the tele position. If a lower limit of 0 of the condition (4) is exceeded, a telephoto ratio will be enhanced, whereby the optical system will have a long total length and cannot be configured compact. If an upper limit of 0.023 is exceeded, in contrast, aberrations, distortion in particular, will be overcorrected.

The condition (5) defines a correction sensitivity of an image surface position when the second lens unit G2 is moved in the direction of the optical axis and if a lower limit of 15 the condition (5) is exceeded, the second lens unit G2 will be moved for a long distance for focusing, thereby forming an obstacle to shortening a shortest object distance. If an upper limit of 27 of the condition (5) is exceeded, in contrast, the correction sensitivity of the image surface position will be too high and a stopping precision for the second lens unit will be strict.

The condition (6) defines a ratio of the focal length f1 of the first lens unit G1 relative to the optional focal length fTa in the focal length region exceeding 3.8 times of the focal length at the wide position and if a lower limit of 0.3 of the condition (6) is exceeded, the first lens unit G1 will have strong refractive power and optical performance will be lowered remarkably due to an eccentricity of a lens element. If an upper limit of 0.5 of the condition (6) is exceeded, in contrast, the first lens unit G1 will have weak refractive power and the optical system will have a long total length.

It is preferable for the zoom optical system having the first composition according to the present invention that the first lens unit G1 having the positive refractive power comprises, in order from the object side, a negative meniscus lens element having a concave surface on the object side, and a positive lens element which has curvature on an object side convex surface higher than that on an image side surface, and that the third lens unit G3 comprises, in order from the object side, a biconcave lens element, a positive lens element which has curvature on an object side convex surface higher than that on an image side surface and a negative lens element which has curvature on an object side concave surface higher than that on an image side surface.

When the first lens unit G1 consists of two lens elements, in order from the object side, a negative meniscus lens element having a concave surface on the object side and a positive lens element which has curvature on an object side surface higher than that on an image side surface in the above described zoom optical system according to the present invention as described above, it is easy to set a principal point of the first lens unit G1 at a location which permits shortening a total length of the optical system and favorably correcting aberrations, distortion in particular.

For favorably correcting aberrations, curvature of field and astigmatism in particular, in the zoom optical system having the above described first or fourth composition according to the present invention, it is desirable to configure the third lens unit G3 so as to comprise, in order from the object side, a biconcave lens element, a positive lens element which has curvature on an object side convex surface higher than that on an image side surface and a negative lens element which has curvature on an object side concave surface higher than that on an image side surface.

Furthermore, it is desirable that the optical system having the above described second or third composition satisfies the following condition (4A):

$$0 < H(G1)/fT < 0.023 \tag{4A}$$

The condition (4A) defines a ratio of the distance H(G1) as measured from the first surface of the first lens unit G1 to the front principal point of this lens unit G1 relative to the focal length of the optical system as a whole at the tele position. If a lower limit of the condition (4A) is exceeded, a telephoto ratio of the optical system, that is, a ratio L(T)/fT of a total length L(T) at the tele position relative to a focal length fT of the optical system as a whole at the tele position will be high, thereby making it impossible to configure the optical system so as to have a short total length. If an upper limit of the condition (4A) is exceeded, aberrations, distortion in particular, will be overcorrected.

Furthermore, it is desirable for the optical system having the above described first, second or third composition to satisfy the following condition (5):

$$15 < (\beta 3T)^2 - (\beta 3T)^2 \times (\beta 2T)^2 < 27 \tag{5}$$

wherein reference symbols β2T and β3T represent magnifications of the second lens unit and the third lens unit respectively at the tele position.

The above-mentioned condition (5) defines the correction sensitivity of the image surface position when the second lens unit G2 is moved in the direction of the optical axis as described above and if a lower limit of 15 is exceeded, the second lens unit G2 will be moved for a long distance for focusing, thereby forming an obstacle to shortening of a shortest object distance. If an upper limit of 27 is exceeded, in contrast, the correction sensitivity of the image surface positive will be too high, thereby posing a severer stopping precision for the second lens unit G2.

Furthermore, it is desirable for the optical system having the above described first, second, third or fourth composition to satisfy the following condition (6):

$$0.3 < f1/fT < 0.5 \tag{6}$$

wherein a reference symbol f1 represents a focal length of the first lens unit G1.

The condition (6) defines a ratio of the focal length f1 of the first lens unit G1 relative to the focal length fT of the optical system as a whole at the tele position.

If a lower limit of 0.3 of the condition (6) is exceeded, the first lens unit will have strong refractive power, whereby optical performance of the optical system will be lowered remarkably due to eccentricity of a lens element. If an upper limit of 0.5 of the condition (6) is exceeded, in contrast, the first lens unit G1 will have weak refractive power, thereby prolonging a total length of the optical system.

It is possible to correct longitudinal chromatic aberration and offaxial chromatic aberration effectively in the optical system having the above described first, second, third or fourth composition by configuring the second lens unit G2 so as to comprise at least a cemented lens component which consists of a negative lens element and a positive lens element and has negative refractive power, and a cemented lens component which consists of a negative lens element and a positive lens element and has positive refractive power.

It is desirable for the optical system having the first, second, third or fourth composition to configure the third lens unit G3 so as to comprise an aspherical lens element on which an aspherical surface is formed by coating a thin resin film on a concave surface of a spherical lens element and configure this aspherical lens element so as to satisfy the following condition (7):

$$0.2 < [(1/Rb - 1/Ra)/(N1 - N2)]Y < 0.9 \tag{7}$$

wherein a reference symbol Ra represents a local radius of curvature on the aspherical surface at a height of Y as measured from an optical axis, that is, a distance of a normal to the aspherical surface at the height of Y from the optical axis as measured from the aspherical surface to an intersection of the normal with the optical axis, a reference symbol Rb designates a radius of curvature on the optical axis of the aspherical surface, and reference symbols N1 and N2 denote refractive indices on the object side and the image side respectively of the aspherical surface.

When the condition (7) is satisfied, it is possible to easily form an aspherical surface which is capable of obtaining favorable imaging performance without remarkably changing a thickness of coated resin film.

When the thickness of the coated resin film changes remarkably on the aspherical lens element, optical performance is degraded due to temperature and humidity variations. A remarkable change in the thickness of the coated resin film is not preferable also from a viewpoint of coagulation easiness of the resin at a manufacturing stage.

If a lower limit of the condition (7) is exceeded, an effect of the aspherical surface will undesirably be lost. If an upper limit of the condition (7) is exceeded, in contrast, aberrations will undesirably be unbalanced in the optical system as a whole.

It is more desirable to configure the aspherical lens element so as to satisfy, in place of the condition (7), the following condition (7-1):

$$-0.1 < (1/Rb - 1/Ra)/(N1 - N2) < 0.4 \tag{7-1}$$

Furthermore, it is desirable for the optical system having the above described first, second, third or fourth composition that an Abbe's number $v_d$ (1R) of the positive lens element disposed at a most image side location in the first lens unit G1 satisfies the following condition (8):

$$v_d(1R)>81 \tag{8}$$

In case of a zoom optical system which has a short total length like that according to the present invention, it is desirable to use a lowly dispersive glass material for the positive lens element to be disposed in the first lens unit G1. In other words, it is possible to reduce both longitudinal chromatic aberration and lateral chromatic by using a glass material which satisfies the condition (8) for the positive lens element to be disposed in the first lens unit G1.

It is desirable for the zoom optical system according to the present invention to configure the third lens unit G3 so as to comprise an aspherical lens element as described above. It is conceived in such a case to dispose a thin film on a lens surface and configure a surface of this film as an aspherical surface.

Since an image surface position of a resin film of such a composite lens element changes due to humidity changes, it is necessary to reduce a change of this image surface position.

In order to reduce such a change of the image surface position of the composite lens element due to a humidity change, it is desirable to satisfy the following condition (9):

$$K<0.01 \tag{9}$$

wherein a reference symbol K represents a water absorption ratio of the resin which is given as K=(M2−M1)/M1 when a test piece which has a weight of M1 in a dry condition has a weight of M2 after being dipped in pure water at 23±2° C. for 23±1 hours.

A conventional composite lens element which uses a resin film having K=0.013 cannot provide a sufficiently satisfactory change of an image surface position due to a humidity change and it is desirable that resin has K<0.01.

It is more desirable than K<0.005.

It is possible to reduce an outside diameter of the first lens unit G1 by disposing an aperture stop S between the first lens unit G1 and the second lens unit G2 in the zoom optical system according to the present invention. This aperture stop S is effective for lowering a manufacturing cost when an expensive glass material such as a special lowly dispersive glass material is to be used in the first lens unit in particular.

When the aperture stop S is disposed in the second lens unit G2 of the zoom optical system according to the present invention, the aperture stop S is located nearly at a center of the optical system, thereby making it possible to favorably balance performance and prevent curvature of field from being varied by focusing the optical system from an object located at infinite distance onto an object located at an extremely short distance.

Furthermore, an outside diameter of the third lens unit G3 can be reduce by disposing the aperture stop S between the second lens unit G2 and the third lens unit G3. Such disposition of the aperture stop S makes it possible to reduce a weight of the third lens unit G3 and lower a power consumption of a driving system which moves the third lens unit G3 for focusing the optical system from the object located at the infinite distance onto the object located at the extremely short distance.

Embodiments of the optical system according to the present invention have composition illustrated in FIGS. 1 through 12 and numerical data which is listed below:

Embodiment 1

$f = 39.31940 \sim 80.13121 \sim 164.38211$,
$F / 4.96 \sim F / 8.10 \sim F / 13.07$

| | | |
|---|---|---|
| $r_1 = -36.1529$ | | |
| $d_1 = 1.2000$ | $n_1 = 1.84666$ | $v_1 = 23.78$ |
| $r_2 = -54.4078$ | | |
| $d_2 = 0.2000$ | | |
| $r_3 = 25.5545$ | | |
| $d_3 = 2.4215$ | $n_2 = 1.49700$ | $v_2 = 81.54$ |
| $r_4 = -133.2312$ | | |
| $d_4 = D_1$ (variable) | | |
| $r_5 = \infty$ (stop) | | |
| $d_5 = 2.0000$ | | |
| $r_6 = -16.9867$ | | |
| $d_6 = 1.0000$ | $n_3 = 1.77250$ | $v_3 = 49.60$ |
| $r_7 = 8.7422$ | | |
| $d_7 = 3.3565$ | $n_4 = 1.69895$ | $v_4 = 30.13$ |
| $r_8 = -73.0473$ | | |
| $d_8 = 0.2000$ | | |
| $r_9 = 29.0257$ | | |
| $d_9 = 3.1240$ | $n_5 = 1.58913$ | $v_5 = 61.28$ |
| $r_{10} = -19.3609$ (aspherical surface) | | |
| $d_{10} = 0.7401$ | | |
| $r_{11} = -26.5554$ | | |
| $d_{11} = 1.0000$ | $n_6 = 1.80518$ | $v_6 = 25.42$ |
| $r_{12} = 26.5554$ | | |
| $d_{12} = 3.6355$ | $n_7 = 1.69680$ | $v_7 = 55.53$ |
| $r_{13} = -14.6956$ | | |
| $d_{13} = D_2$ (variable) | | |
| $r_{14} = -38.2626$ (aspherical surface) | | |
| $d_{14} = 0.2500$ | $n_8 = 1.52540$ | $v_8 = 51.76$ |
| $r_{15} = -47.4401$ | | |
| $d_{15} = 1.3000$ | $n_9 = 1.77250$ | $v_9 = 49.60$ |
| $r_{16} = 47.4401$ | | |
| $d_{16} = 0.1000$ | | |
| $r_{17} = 33.3286$ | | |
| $d_{17} = 3.5615$ | $n_{10} = 1.80518$ | $v_{10} = 25.42$ |
| $r_{18} = -194.2847$ | | |
| $d_{18} = 4.5514$ | | |
| $r_{19} = -14.6422$ | | |
| $d_{19} = 1.5000$ | $n_{11} = 1.69680$ | $v_{11} = 55.53$ |
| $r_{20} = -490.6813$ | | |
| $d_{20} = D_3$ (variable) | | |
| $r_{21} = \infty$ (image surface) | | |

Aspherical Surface Coefficients
(10th surface)

$k=0.1250$, $A_2=0$, $A_4=7.5359\times10^{-5}$
$A_6=2.0463\times10^{-7}$, $A_8=3.2548\times10^{-9}$
$A_{10}=-2.9785\times10^{-10}$ (14th surface)

$k=-5.1715$, $A_2=0$, $A_4=3.2714\times10^{-5}$
$A_6=6.9860\times10^{-8}$, $A_8=-9.0299\times10^{-10}$
$A_{10}=1.3124\times10^{-11}$

| f | 39.31940 | 80.13121 | 164.38211 |
|---|---|---|---|
| $D_1$ | 3.68833 | 12.56033 | 19.76177 |
| $D_2$ | 12.35471 | 5.79428 | 1.33706 |
| $D_3$ | 8.28699 | 30.85166 | 72.96047 |

$fW=39.3194$, $fT=164.382$, $f1=63$, $f2=29.4218$ $f3=-17.883$, $\beta 2W=0.39372$, $\beta 2T=0.50161$, $\beta 3W=1.58519$, $\beta 3T=5.20173$, $L(fW)=54.4706$, $L(fT)=124.2$ νd(1R)=81.54, S(fW)=46.1836

S(fT)=51.2394, H(G1)=2.24512 fT/fW=4.18 f1/fW=1.60, f1/fT=0.38, f2/fT=0.18 f3/fT=−0.11

$(\beta 3T)^2-(\beta 3T)^2\times(\beta 2T)^2=20.2$

[S(fT)−S(fW)]/(fT−fW)=0.040

L(fT)/fT=0.756, L(fT)/(fT−fW)=0.993

H(G1)/fT=0.0137, $(\beta 3T)^2/[F(T)\times 0.03]=69.0$

[(1/Rb−1/Ra)/(N1−N2)]Y=0.229(max)−0.020(min)

K≈0.013

---

Embodiment 2 f = 39.31941 ~ 80.13127 ~ 154.53982,
F / 4.96 ~ F / 8.10 ~ F / 12.48

| | | | |
|---|---|---|---|
| $r_1$ = −36.4493 | | | |
| $d_1$ = 1.2000 | $n_1$ = 1.84666 | $\nu_1$ = 23.78 | |
| $r_2$ = −55.5727 | | | |
| $d_2$ = 0.2000 | | | |
| $r_3$ = 25.3519 | | | |
| $d_3$ = 2.4287 | $n_2$ = 1.49700 | $\nu_2$ = 81.54 | |
| $r_4$ = −133.6935 | | | |
| $d_4$ = $D_1$ (variable) | | | |
| $r_5$ = ∞ (stop) | | | |
| $d_5$ = 1.5500 | | | |
| $r_6$ = −17.4506 | | | |
| $d_6$ = 1.0000 | $n_3$ = 1.77250 | $\nu_3$ = 49.60 | |
| $r_7$ = 8.8387 | | | |
| $d_7$ = 3.2826 | $n_4$ = 1.69895 | $\nu_4$ = 30.13 | |
| $r_8$ = −82.2223 | | | |
| $d_8$ = 0.2000 | | | |
| $r_9$ = 28.1090 | | | |
| $d_9$ = 3.3851 | $n_5$ = 1.58913 | $\nu_5$ = 61.28 | |
| $r_{10}$ = −19.8676 (aspherical surface) | | | |
| $d_{10}$ = 0.7812 | | | |
| $r_{11}$ = −26.8571 | | | |
| $d_{11}$ = 1.0000 | $n_6$ = 1.80518 | $\nu_6$ = 25.42 | |
| $r_{12}$ = 26.8571 | | | |
| $d_{12}$ = 3.5757 | $n_7$ = 1.69680 | $\nu_7$ = 55.53 | |
| $r_{13}$ = −14.8017 | | | |
| $d_{13}$ = $D_2$ (variable) | | | |
| $r_{14}$ = −38.0320 (aspherical surface) | | | |
| $d_{14}$ = 0.2500 | $n_8$ = 1.52540 | $\nu_8$ = 51.76 | |
| $r_{15}$ = −47.6271 | | | |
| $d_{15}$ = 1.3000 | $n_9$ = 1.77250 | $\nu_9$ = 49.60 | |
| $r_{16}$ = 47.6271 | | | |
| $d_{16}$ = 0.1000 | | | |
| $r_{17}$ = 33.3180 | | | |
| $d_{17}$ = 3.5723 | $n_{10}$ = 1.80518 | $\nu_{10}$ = 25.42 | |
| $r_{18}$ = −162.7512 | | | |
| $d_{18}$ = 4.5439 | | | |
| $r_{19}$ = −14.2928 | | | |
| $d_{19}$ = 1.5000 | $n_{11}$ = 1.69680 | $\nu_{11}$ = 55.53 | |
| $r_{20}$ = −392.1561 | | | |
| $d_{20}$ = $D_3$ (variable) | | | |
| $r_{21}$ = ∞ (image surface) | | | |

Aspherical Surface Coefficients
(10th surface)

k=0.0893, $A_2$=0, $A_4$=7.6179×10$^{-5}$ $A_6$=4.3848×10$^{-8}$, $A_8$=1.241×10$^{-8}$ $A_{10}$=−4.9402×10$^{-10}$ (14th surface)

k=−6.4971, $A_2$=0, $A_4$=3.3365×10$^{-5}$ $A_6$=7.5545×10$^{-9}$, $A_8$=1.2787×10$^{-10}$ $A_{10}$=1.0155×10$^{-11}$

| f | 39.31941 | 80.13127 | 154.53982 |
|---|---|---|---|
| $D_1$ | 3.70124 | 12.21280 | 19.08130 |
| $D_2$ | 12.41552 | 5.84453 | 1.67610 |
| $D_3$ | 8.28700 | 31.19222 | 68.64026 | fW=39.3194, fT=154.54, f1=63, f2=29.7966 f3=−17.94, β2W=0.39499, β2T=0.49614.

β3W=1.5801, β3T=4.9442, L(fW)=54.2733.

L(fT)=119.267

νd(1R)=81.54, S(fW)=45.9863

S(fT)=50.6269, H(G1)=2.23928 fT/fW=3.93 f1/fW=1.60, f1/fT=0.41, f2/fT=0.19 f3/fT=0.11

$(\beta 3T)^2-(\beta 3T)^2\times(\beta 2T)^2=18.4$

[S(fT)−S(fW)]/(fT−fW)=0.040

L(fT)/fT=0.772, L(fT)/(fT−fW)=1.035

H(G1)/fT=0.015, $(\beta 3T)^2/[F(T)\times 0.03]=65.3$

[(1/Rb−1/Ra)/(N1−N2)]Y=0.234(max), −0.020(min)

K≈0.013

---

Embodiment 3 f = 39.31940 ~ 80.13121 ~ 164.38211,
F / 4.96 ~ F / 8.10 ~ F / 13.07

| | | | |
|---|---|---|---|
| $r_1$ = −36.1894 | | | |
| $d_1$ = 1.2000 | $n_1$ = 1.84666 | $\nu_1$ = 23.78 | |
| $r_2$ = −54.2948 | | | |
| $d_2$ = 0.2000 | | | |
| $r_3$ = 25.5904 | | | |
| $d_3$ = 2.4505 | $n_2$ = 1.49700 | $\nu_2$ = 81.54 | |
| $r_4$ = −130.0396 | | | |
| $d_4$ = $D_1$ (variable) | | | |
| $r_5$ = ∞ (stop) | | | |
| $d_5$ = 2.0000 | | | |
| $r_6$ = −16.8396 | | | |
| $d_6$ = 1.0000 | $n_3$ = 1.77250 | $\nu_3$ = 49.60 | |
| $r_7$ = 8.7377 | | | |
| $d_7$ = 3.3498 | $n_4$ = 1.69895 | $\nu_4$ = 30.13 | |
| $r_8$ = −74.7437 | | | |
| $d_8$ = 0.2000 | | | |
| $r_9$ = 29.0957 | | | |
| $d_9$ = 3.1237 | $n_5$ = 1.58913 | $\nu_5$ = 61.28 | |
| $r_{10}$ = −19.2788 (aspherical surface) | | | |
| $d_{10}$ = 0.7122 | | | |
| $r_{11}$ = −26.7824 | | | |
| $d_{11}$ = 1.0000 | $n_6$ = 1.80518 | $\nu_6$ = 25.42 | |
| $r_{12}$ = 26.7824 | | | |
| $d_{12}$ = 3.6300 | $n_7$ = 1.69680 | $\nu_7$ = 55.53 | |
| $r_{13}$ = −14.7035 | | | |
| $d_{13}$ = $D_2$ (variable) | | | |

Embodiment 3 -continued

| | | |
|---|---|---|
| $r_{14} = -38.5269$ (aspherical surface) | | |
| $d_{14} = 0.2500$ | $n_8 = 1.53416$ | $v_8 = 40.99$ |
| $r_{15} = -47.6601$ | | |
| $d_{15} = 1.3000$ | $n_9 = 1.77250$ | $v_9 = 49.60$ |
| $r_{16} = 47.6601$ | | |
| $d_{16} = 0.1000$ | | |
| $r_{17} = 33.7700$ | | |
| $d_{17} = 3.5590$ | $n_{10} = 1.80518$ | $v_{10} = 25.42$ |
| $r_{18} = -183.6194$ | | |
| $d_{18} = 4.5556$ | | |
| $r_{19} = -14.6445$ | | |
| $d_{19} = 1.5000$ | $n_{11} = 1.69680$ | $v_{11} = 55.53$ |
| $r_{20} = -471.5265$ | | |
| $d_{20} = D_3$ (variable) | | |
| $r_{21} = \infty$ (image surface) | | |

Aspherical Surface Coefficients (10th surface) $k=-0.0859$, $A_2=0$, $A_4=7.1654\times10^{-5}$ $A_6=2.9034\times10^{-7}$, $A_8=-2.2409\times10^{-9}$ $A_{10}=-1.9366\times10^{-10}$ (14th surface) $k=-5.0472$, $A_2=0$, $A_4=3.2262\times10^{-5}$ $A_6=9.5888\times10^{-8}$, $A_8=-1.3521\times10^{-9}$ $A_{10}=1.5070\times10^{-11}$

| f | 39.31940 | 80.13121 | 164.38211 |
|---|---|---|---|
| $D_1$ | 3.67961 | 12.53299 | 19.66716 |
| $D_2$ | 12.41653 | 5.81695 | 1.33350 |
| $D_3$ | 8.28699 | 30.86803 | 73.06844 |

$fW=39.3194, fT=164.382, f1=62.535, f2=29.493$ $f3=-17.933, \beta2W=0.39701, \beta2T=0.50588,$ $\beta3W=1.58373, \beta3T=5.19614, L(fW)=54.5139$ .

$L(fT)=124.2$ $vd(1R)=81.54, S(fW)=46.2269$ $S(fT)=51.1315, H(G1)=2.24678$ $fT/fW=4.18$ $f1/fW=1.59, f1/fT=0.38, f2/fT=0.18$ $f3/fT=-0.11$ $(\beta3T)^2-(\beta3T)^2\times(\beta2T)^2=20.1$ $[S(fT)-S(fW)]/(fT-fW)=0.039$ $L(fT)/fT=0.756, L(fT)/(fT-fW)=0.993$ $H(G1)/fT=0.0137$.

$(\beta3T)^2/[F(T)\times0.03]68.9$ $[(1/Rb-1/Ra)/(N1-N2)]Y=-0.226(max), -0.019(min)$ $K\approx 0.004$

Embodiment 4

$f = 39.31940 \sim 80.13121 \sim 193.30266,$
$F / 4.96 \sim F / 8.10 \sim F / 14.76$
$r_1 = -36.3477$

Embodiment 4 -continued

| | | |
|---|---|---|
| $d_1 = 1.2000$ | $n_1 = 1.84666$ | $v_1 = 23.78$ |
| $r_2 = -54.7150$ | | |
| $d_2 = 0.2000$ | | |
| $r_3 = 25.5347$ | | |
| $d_3 = 2.4505$ | $n_2 = 1.49700$ | $v_2 = 81.54$ |
| $r_4 = -127.2069$ | | |
| $d_4 = D_1$ (variable) | | |
| $r_5 = \infty$ (stop) | | |
| $d_5 = 2.0000$ | | |
| $r_6 = -16.7002$ | | |
| $d_6 = 1.0000$ | $n_3 = 1.77250$ | $v_3 = 49.60$ |
| $r_7 = 8.7781$ | | |
| $d_7 = 3.3498$ | $n_4 = 1.69895$ | $v_4 = 30.13$ |
| $r_8 = -72.9099$ | | |
| $d_8 = 0.2000$ | | |
| $r_9 = 29.3486$ | | |
| $d_9 = 3.1237$ | $n_5 = 1.58913$ | $v_5 = 61.28$ |
| $r_{10} = -19.2291$ (aspherical surface) | | |
| $d_{10} = 0.7122$ | | |
| $r_{11} = -27.2785$ | | |
| $d_{11} = 1.0000$ | $n_6 = 1.80518$ | $v_6 = 25.42$ |
| $r_{12} = 26.3908$ | | |
| $d_{12} = 3.6300$ | $n_7 = 1.69680$ | $v_7 = 55.53$ |
| $r_{13} = -14.7850$ | | |
| $d_{13} = D_2$ (variable) | | |
| $r_{14} = -39.6276$ (aspherical surface) | | |
| $d_{14} = 0.2500$ | $n_8 = 1.53416$ | $v_8 = 40.99$ |
| $r_{15} = -49.3489$ | | |
| $d_{15} = 1.3000$ | $n_9 = 1.77250$ | $v_9 = 49.60$ |
| $r_{16} = 44.1627$ | | |
| $d_{16} = 0.1000$ | | |
| $r_{17} = 33.3027$ | | |
| $d_{17} = 3.5590$ | $n_{10} = 1.80518$ | $v_{10} = 25.42$ |
| $r_{18} = -189.4038$ | | |
| $d_{18} = 4.5556$ | | |
| $r_{19} = -14.5720$ | | |
| $d_{19} = 1.5000$ | $n_{11} = 1.69680$ | $v_{11} = 55.53$ |
| $r_{20} = -317.8457$ | | |
| $d_{20} = D_3$ (variable) | | |
| $r_{21} = \infty$ (image surface) | | |

Aspherical Surface Coefficients (10th surface) $k=-0.0859$, $A_2=0$, $A_4=7.1654\times10^{-5}$ $A_6=2.9034\times10^{-7}$, $A_8=-2.2409\times10^{-9}$ $A_{10}=-1.9366\times10^{-10}$ (14th surface) $k=-5.2953$, $A_2=0$, $A_4=3.2462\times10^{-5}$ $A_6=1.2152\times10^{-7}$, $A_8=-1.8474\times10^{-9}$ $A_{10}=1.7629\times10^{-11}$

| f | 39.31940 | 80.13121 | 193.30266 |
|---|---|---|---|
| $D_1$ | 3.67904 | 12.48341 | 20.98000 |
| $D_2$ | 12.35828 | 5.78330 | 0.50000 |
| $D_3$ | 8.28699 | 30.87775 | 86.83828 |

$fW39.3194, fT=193.303, f1=62.1246, f2=29.4063$ $f3=-17.892, \beta2W=0.39843, \beta2T=0.52043,$ $\beta3W=1.58851, \beta3T=5.9788, L(fW)=54.4551,$ $L(fT)=138.449$ $vd(1R)=81.54, S(fW)=46.1681$ $S(fT)=51.6108, H(G1)=2.24238$ $fT/fW=4.92$ $f1/fW=1.58, f1/fT=0.32, f2/fT=0.15$ $f3/fT=-0.09$ $(\beta 3T)^2 - (\beta 3T)^2 \times (\beta 2T)^2 = 26.1$ $[S(fT) - S(fW)]/(fT - fW) = 0.035$ $L(fT)/fT = 0.716$, $L(fT)/(fT - fW) = 0.899$ $H(G1)/fT = 0.012$, $(\beta 3T)^2/[F(T) \times 0.03]80.7$ $[(1/Rb - 1/Ra)/(N1 - N2)]Y = 0.213(\max), -0.019(\min)$ $K \approx 0.004$

---

Embodiment 5 f = 39.29851 ~ 80.05797 ~ 174.70221,
F / 4.97 ~ F / 7.80 ~ F / 13.69

| | | | |
|---|---|---|---|
| $r_1 = -36.1261$ | | | |
| $d_1 = 1.2000$ | | $n_1 = 1.84666$ | $v_1 = 23.78$ |
| $r_2 = -54.4475$ | | | |
| $d_2 = 0.2000$ | | | |
| $r_3 = 25.5172$ | | | |
| $d_3 = 2.4500$ | | $n_2 = 1.49700$ | $v_2 = 81.54$ |
| $r_4 = -133.2284$ | | | |
| $d_4 = D_1$ (variable) | | | |
| $r_5 = \infty$ (stop) | | | |
| $d_5 = 2.0000$ | | | |
| $r_6 = -16.9532$ | | | |
| $d_6 = 1.0000$ | | $n_3 = 1.77250$ | $v_3 = 49.60$ |
| $r_7 = 8.7541$ | | | |
| $d_7 = 3.3500$ | | $n_4 = 1.69895$ | $v_4 = 30.13$ |
| $r_8 = -73.0913$ | | | |
| $d_8 = 0.2000$ | | | |
| $r_9 = 28.8312$ | | | |
| $d_9 = 3.1200$ | | $n_5 = 1.58913$ | $v_5 = 61.28$ |
| $r_{10} = -19.3441$ (aspherical surface) | | | |
| $d_{10} = 0.7100$ | | | |
| $r_{11} = -26.5172$ | | | |
| $d_{11} = 1.0000$ | | $n_6 = 1.80518$ | $v_6 = 25.42$ |
| $r_{12} = 26.5172$ | | | |
| $d_{12} = 3.6300$ | | $n_7 = 1.69680$ | $v_7 = 55.53$ |
| $r_{13} = -14.7051$ | | | |
| $d_{13} = D_2$ (variable) | | | |
| $r_{14} = -38.0113$ (aspherical surface) | | | |
| $d_{14} = 0.2500$ | | $n_8 = 1.50573$ | $v_8 = 56.19$ |
| $r_{15} = -47.4953$ | | | |
| $d_{15} = 1.3000$ | | $n_9 = 1.77250$ | $v_9 = 49.60$ |
| $r_{16} = 47.4953$ | | | |
| $d_{16} = 0.1000$ | | | |
| $r_{17} = 33.3930$ | | | |
| $d_{17} = 3.5600$ | | $n_{10} = 1.80518$ | $v_{10} = 25.42$ |
| $r_{18} = -194.3824$ | | | |
| $d_{18} = 4.5600$ | | | |
| $r_{19} = -14.6522$ | | | |
| $d_{19} = 1.5000$ | | $n_{11} = 1.69680$ | $v_{11} = 55.53$ |
| $r_{20} = -493.1845$ | | | |
| $d_{20} = D_3$ (variable) | | | |
| $r_{21} = \infty$ (image surface) | | | |

Asherical Surface Coefficients (10th Surface) $k = -0.0859$, $A_2 = 0$, $A_4 = 7.1654 \times 10^{-5}$ $A_6 = 2.9034 \times 10^{-7}$, $A_8 2.2409 \times 10^{-9}$ $A_{10} = -1.9366 \times 10^{-10}$ (14th Surface) $k = -3.2629$, $A_2 0$, $A_4 = 3.8379 \times 10^{-5}$ $A_6 = 7.9877 \times 10^{-8}$, $A_8 = -1.1213 \times 10^{-9}$

| f | 39.29851 | 80.05797 | 174.70221 |
|---|---|---|---|
| $D_1$ | 3.69830 | 12.57030 | 20.38600 |
| $D_2$ | 12.35587 | 5.79424 | 1.00580 |
| $D_3$ | 8.27239 | 30.81038 | 77.78114 | fW=39.2985, fT=174.702, f1=63.0009, f2=29.4247 f3=-17.886, β2W=0.39371, β2T=0.5069,

β3W=1.58434, β3T=5.47057, L(fW)=54.4566,

L(fT)=129.303

νd(1R)=81.54, S(fW)=46.1842

S(fT)=51.5218, H((G1)=2.25057 fT/fW=4.45 f1/fW=1.60, f1/fT=0.36, f2/fT=0.17 f3/fT=-0.10

$(\beta 3T)^2 - (\beta 3T)^2 \times (\beta 2T)^2 = 22.23$ $[S(fT) - S(fW)]/(fT - fW) = 0.039$ $L(fT)/fT = 0.740$, $L(fT)/(fT - fW) 0.955$ $H(G1)/fT = 0.0129$, $((\beta 3T)^2/[F(T) \times 0.3] = 72.8$ $[(1/Rb - 1/Ra)/(N1N2)]Y = 0.230(\max), -0.020(\min)$ $K \approx 0.004$

---

Embodiment 6 f = 39.00131 ~ 77.99475 ~ 154.97196,
F/5.07 ~ F/7.93 ~ F/12.40

| | | | |
|---|---|---|---|
| $r_1 = -55.2820$ | | | |
| $d_1 = 1.2000$ | $n_1 = 1.84666$ | $v_1 = 23.78$ | |
| $r_2 = -120.9191$ | | | |
| $d_2 = 0.2000$ | | | |
| $r_3 = 22.8989$ | | | |
| $d_3 = 2.6969$ | $n_2 = 1.49700$ | $v_2 = 81.54$ | |
| $r_4 = -293.2573$ | | | |
| $d_4 = D_1$ (variable) | | | |
| $r_5 = -18.4950$ | | | |
| $d_5 = 1.2226$ | $n_3 = 1.80440$ | $v_3 = 39.59$ | |
| $r_6 = 12.9349$ | | | |
| $d_6 = 3.6678$ | $n_4 = 1.75520$ | $v_4 = 27.51$ | |
| $r_7 = -50.3791$ | | | |
| $d_7 = 0.5546$ | | | |
| $r_8 = \infty$ (stop) | | | |
| $d_8 = 2.8591$ | | | |
| $r_9 = 16.9870$ | | | |
| $d_9 = 2.6078$ | $n_1 = 1.80809$ | $v_5 = 22.76$ | |
| $r_{10} = 10.5546$ | | | |
| $d_{10} = 3.9730$ | $n_6 = 1.51633$ | $v_6 = 64.14$ | |
| $r_{11} = -16.4665$ (aspherical surface) | | | |
| $d_{11} = D_2$ (variable) | | | |
| $r_{12} = -30.5029$ (aspherical surface) | | | |
| $d_{12} = 0.2500$ | $n_7 = 1.52288$ | $v_7 = 52.50$ | |
| $r_{13} = -39.6951$ | | | |
| $d_{13} = 1.0000$ | $n_8 = 1.77250$ | $v_8 = 49.60$ | |
| $r_{14} = 235.6280$ | | | |
| $d_{14} = 0.2000$ | | | |
| $r_{15} = 47.5727$ | | | |
| $d_{15} = 3.0797$ | $n_9 = 1.80809$ | $v_9 = 22.76$ | |
| $r_{16} = -115.6313$ | | | |
| $d_{16} = 3.9290$ | | | |
| $r_{17} = -15.0820$ | | | |
| $d_{17} = 1.5000$ | $n_{10} = 1.77250$ | $v_{10} = 49.60$ | |
| $r_{18} = -8611.4904$ | | | |
| $d_{18} = D_3$ (variable) | | | |
| $r_{19} = \infty$ (image surface) | | | |

Aspherical Surface Coefficients (11th Surface) $k = -1.0134$, $A_2 = 0$, $A_4 = 3.5513 \times 10^{-5}$ $A_6 = -3.5589 \times 10^{-7}$, $A_8 = 1.3077 \times 10^{-8}$ $A_{10} = -2.3711 \times 10^{-10}$ (12th Surface) $k = -1.1562$, $A_2 = 0$, $A_4 = 5.3599 \times 10^{-5}$ $A_6 = 1.8661 \times 10^{-7}$, $A_8 = -1.5844 \times 10^{-9}$ $A_{10} = 1.0255 \times 10^{-1}$

| f     | 39.00131 | 77.99475 | 154.97196 |
|-------|----------|----------|-----------|
| $D_1$ | 2.42919  | 12.47865 | 17.14445  |
| $D_2$ | 13.07736 | 6.48724  | 2.50000   |
| $D_3$ | 8.50048  | 29.49424 | 71.39986  |

$fW$=39.0013, $fT$=154.972, $f\mathbf{1}$=65, $f\mathbf{2}$=30.3329

$f\mathbf{3}$=−17.967, $\beta 2W$=0.38308, $\beta 2T$=0.47052, $\beta 3W$=1.56632, $\beta 3T$=5.06716, $L(fW)$=52.9476, $L(fT)$=119.985

$vd(1R)$=81.54, $S(fW)$=44.4471

$S(fT)$=48.5851, $H(G1)$=1.78077

$fT/fW$=3.97

$f\mathbf{1}/fW$=1.67, $f\mathbf{1}/fT$=0.42, $f\mathbf{2}/fT$=0.20

$f\mathbf{3}/fT$=−0.12

$(\beta 3T)^2-(\beta 3T)^2\times(\beta 2T)^2$=20.0

$[S(fT)-S(fW)]/(fT-fW)$=0.036

$L(fT)/fT$=0.774, $L(fT)/(fT-fW)$=1.035

$H(G1)/fT$=0.0115, $(\beta 3T)^2/[F(T)\times 0.03]$=69.0

$[(1/Rb-1/Ra)/(N1-N2)]Y$=0.204(max),−0.032(min)

$K\approx 0.013$

Embodiment 7

$f = 39.00006 \sim 78.00015 \sim 155.00050$
$F/5.07 \sim F/7.93 \sim F/12.40$
$r_1 = -41.7856$
 $d_1 = 1.2000$   $n_1 = 1.84666$   $v_1 = 23.78$
$r_2 = -71.0649$
 $d_2 = 0.2000$
$r_3 = 27.0469$
 $d_3 = 3.0355$   $n_2 = 1.49700$   $v_2 = 81.54$
$r_4 = -100.2000$
 $d_4 = D_1$ (variable)
$r_5 = -19.5893$
 $d_5 = 1.2226$   $n_3 = 1.83400$   $v_3 = 37.16$
$r_6 = 10.2509$
 $d_6 = 3.8546$   $n_4 = 1.74077$   $v_4 = 27.79$
$r_7 = -34.7172$
 $d_7 = 0.5546$
$r_8 = \infty$ (stop)
 $d_8 = 3.7692$
$r_9 = 17.7730$
 $d_9 = 2.3607$   $n_5 = 1.80809$   $v_5 = 22.76$
$r_{10} = 11.2606$
 $d_{10} = 4.4446$   $n_6 = 1.48749$   $v_6 = 70.23$
$r_{11} = -15.4109$ (aspherical surface)
 $d_{11} = D_2$ (variable)
$r_{12} = 46.7644$ (aspherical surface)
 $d_{12} = 0.2500$   $n_7 = 1.52288$   $v_7 = 52.50$
$r_{13} = -84.1095$
 $d_{13} = 1.0000$   $n_8 = 1.80400$   $v_8 = 46.57$
$r_{14} = 74.4998$
 $d_{14} = 0.2000$
$r_{15} = 43.7443$
 $d_{15} = 2.7938$   $n_9 = 1.80809$   $v_9 = 22.76$ -continued Embodiment 7

$r_{16} = -280.1664$
 $d_{16} = 4.7710$
$r_{17} = -12.8051$
 $d_{17} = 1.5000$   $n_{10} = 1.72916$   $v_{10} = 54.68$
$r_{18} = -152.0771$
 $d_{18} = D_3$ (variable)
$r_{19} = \infty$ (image surface)

Aspherical Surface Coefficients (11th Surface) $k=-0.6080$, $A_2=0$, $A_4=2.6727\times 10^{-5}$ $A_6=-2.0459\times 10^{-7}$, $A_8=4.8924\times 10^{-9}$ $A_{10}=-1.7009\times 10^{-10}$ (12th Surface) $k=-3.9144$, $A_2=0$, $A_4=5.6210\times 10^{-5}$ $A_6=1.9143\times 10^{-7}$, $A_8=1.5570\times 10^{-9}$ $A_{10}=1.8313\times 10^{-11}$

| f     | 39.00006 | 78.00015 | 155.00050 |
|-------|----------|----------|-----------|
| $D_1$ | 2.39713  | 13.38809 | 17.71289  |
| $D_2$ | 12.68411 | 6.32098  | 2.50000   |
| $D_3$ | 8.50003  | 28.17824 | 68.63072  |

$fW$=39.0001, $fT$=155.001, $f\mathbf{1}$=65, $f\mathbf{2}$=29.2361

$f\mathbf{3}$=−17.286, $\beta 2W$=0.37747, $\beta 2T$=0.47051, $\beta 3W$=1.58954, $\beta 3T$=5.06819, $L(fW)$=54.7379, $L(fT)$=120

$vd(1R)$=81.54, $S(fW)$=46.2379

$S(fT)$=51.3695, $H(G1)$=2.42839

$fT/fW$=3.97

$f\mathbf{1}/fW$=1.67, $f\mathbf{1}/fT$=0.42, $f\mathbf{2}/fT$=0.19

$f\mathbf{3}/fT$=−0.11

$(\beta 3T)^2-(\beta 3T)^2\times(\beta 2T)^2$=20.0

$[S(fT)-S(fW)]/(fT-fW)$=0.044

$L(fT)/fT$=0.774, $L(fT)/(fT-fW)$=1.034

$H(G1)/fT$=0.0157, $(\beta 3T)^2/[F(T)\times 0.03]$=69.0

$[(1/Rb-1/Ra)/(N1-N2)]Y$=0.245(max), −0.043(min)

$K\approx 0.013$

Embodiment 8

$f = 39.34207 \sim 78.02837 \sim 154.35649$,
$F/4.93 \sim F/7.49 \sim F/12.38$
$r_1 = -44.5650$
 $d_1 = 1.5000$   $n_1 = 1.84666$   $v_1 = 23.78$
$r_2 = 66.0577$
 $d_2 = 0.1500$
$r_3 = 24.1165$
 $d_3 = 3.8000$   $n_2 = 1.49700$   $v_2 = 81.54$
$r_4 = -237.8975$
 $d_4 = D_1$ (variable)
$r_5 = 20.7950$
 $d_5 = 1.4500$   $n_3 = 1.83400$   $v_3 = 37.16$ -continued Embodiment 8

| | | | |
|---|---|---|---|
| $r_6$ = 11.1186 | | | |
| | $d_6$ = 3.5500 | $n_4$ = 1.72825 | $v_4$ = 28.46 |
| $r_7$ = 160.8286 | | | |
| | $d_7$ = 0.1200 | | |
| $r_8$ = 19.6614 | | | |
| | $d_8$ = 3.6336 | $n_5$ = 1.80809 | $v_5$ = 22.76 |
| $r_9$ = 15.0183 | | | |
| | $d_9$ = 3.0000 | $n_6$ = 1.51742 | $v_6$ = 52.43 |
| $r_{10}$ = −64.0395 | | | |
| | $d_{10}$ = 0.1500 | | |
| $r_{11}$ = 32.3241 | | | |
| | $d_{11}$ = 2.4500 | $n_7$ = 1.51633 | $v_7$ = 64.14 |
| $r_{12}$ = −19.3761 (aspherical surface) | | | |
| | $d_{12}$ = $D_2$ (variable) | | |
| $r_{13}$ = ∞ (stop) | | | |
| | $d_{13}$ = $D_3$ (variable) | | |
| $r_{14}$ = −18.9165 (aspherical surface) | | | |
| | $d_{14}$ = 0.1500 | $n_8$ = 1.52288 | $v_8$ = 52.50 |
| $r_{15}$ = −26.9708 | | | |
| | $d_{15}$ = 2.3000 | $n_9$ = 1.80809 | $v_9$ = 22.76 |
| $r_{16}$ = −17.9565 | | | |
| | $d_{16}$ = 3.2228 | | |
| $r_{17}$ = 9.7000 | | | |
| | $d_{17}$ = 1.6000 | $n_{10}$ = 1.72916 | $v_{10}$ = 54.68 |
| $r_{18}$ = −59.2171 | | | |
| | $d_{18}$ = $D_4$ (variable) | | |
| $r_{19}$ = ∞ (image surface) | | | |

Aspherical Surface Coefficients (12th Surface) $k=-0.7229$, $A_2=0$, $A_4=4.2016\times10^{-5}$ $A_6=-6.4534\times10^{-10}$, $A_8=5.4085\times10^{-11}$ $A_{10}=5.8453\times10^{-11}$ (14th Surface) $k=-10.9706$, $A_2=0$, $A_4=-8.7105\times10^{-5}$ $A_6=2.7106\times10^{-6}$, $A_8=-1.6444\times10^{-8}$ $A_{10}=1.2744\times10^{-10}$

| f | 39.34207 | 78.02837 | 154.35649 |
|---|---|---|---|
| $D_1$ | 3.42320 | 12.58945 | 16.38676 |
| $D_2$ | 0.50000 | 0.50000 | 0.50000 |
| $D_3$ | 14.49499 | 7.46666 | 3.29506 |
| $D_4$ | 8.38971 | 29.23621 | 71.59514 |

$fW$=39.3421, $fT$=154.356, $f1$=58.8059, $f2$=31.8882

$f3$=−18.38, $β2W$=0.43406, $β2T$=0.52706, $β3W$=1.54131, $β3T$=4.98016, $L(fW)$=53.8842, $L(fT)$=118.853

$vd(1R)$=81.54, $S(fW)$=45.4945

$S(fT)$=47.2582, $H(G1)$=2.19696

$fT/fW$=3.92

$f1/fW$=1.49, $f1\,fT$=0.38, $f2/fT$=0.21

$f3/fT$=0.12

$(β3T)^2-(β3T)^2\times(β2T)^2$=17.91

$[S(fT)-S(fW)]/(fT-fW)$=0.015

$L(fT)/fT$=0.770, $L(fT)/(fT-fW)$=1.033

$H(G1)/fT$=0.0142

$(β3T)^2/[F(T)\times0.03]$=66.8

$[(1/Rb-1/Ra)/(N1-N2)]Y$=0.319(max), −0.067(min)

$K$≈0.013

Embodiment 9

$f = 39.33845 \sim 85.89193 \sim 192.41503$,
$F/4.79 \sim F/8.07 \sim F/13.90$

| | | | |
|---|---|---|---|
| $r_1$ = −40.0753 | | | |
| | $d_1$ = 1.5000 | $n_1$ = 1.84666 | $v_1$ = 23.78 |
| $r_2$ = −59.5371 | | | |
| | $d_2$ = 0.1500 | | |
| $r_3$ = 30.1811 | | | |
| | $d_3$ = 3.7000 | $n_2$ = 1.49700 | $v_2$ = 81.54 |
| $r_4$ = −117.0178 | | | |
| | $d_4$ = $D_1$ (variable) | | |
| $r_5$ = −22.3137 | | | |
| | $d_5$ = 1.4500 | $n_3$ = 1.83400 | $v_3$ = 37.16 |
| $r_6$ = 13.4338 | | | |
| | $d_6$ = 3.2500 | $n_4$ = 1.72825 | $v_4$ = 28.46 |
| $r_7$ = −108.7335 | | | |
| | $d_7$ = 0.1500 | | |
| $r_8$ = 33.7625 | | | |
| | $d_8$ = 6.9858 | $n_5$ = 1.80809 | $v_5$ = 22.76 |
| $r_9$ = 21.1104 | | | |
| | $d_9$ = 2.9000 | $n_6$ = 1.51742 | $v_6$ = 52.43 |
| $r_{10}$ = −54.8767 | | | |
| | $d_{10}$ = 0.1500 | | |
| $r_{11}$ = 39.6423 | | | |
| | $d_{11}$ = 2.4500 | $n_7$ = 1.51633 | $v_7$ = 64.14 |
| $r_{12}$ = −21.4789 (aspherical surface) | | | |
| | $d_{12}$ = $D_2$ (variable) | | |
| $r_{13}$ = ∞ (stop) | | | |
| | $d_{13}$ = $D_3$ (variable) | | |
| $r_{14}$ = −33.4820 (aspherical surface) | | | |
| | $d_{14}$ = 0.1500 | $n_8$ = 1.52288 | $v_8$ = 52.50 |
| $r_{15}$ = −56.6945 | | | |
| | $d_{15}$ = 1.4500 | $n_9$ = 1.80100 | $v_9$ = 34.97 |
| $r_{16}$ = 80.5137 | | | |
| | $d_{16}$ = 0.2900 | | |
| $r_{17}$ = 40.9960 | | | |
| | $d_{17}$ = 3.1032 | $n_{10}$ = 1.80518 | $v_{10}$ = 25.42 |
| $r_{18}$ = −65.7107 | | | |
| | $d_{18}$ = 4.8609 | | |
| $r_{19}$ = −12.0731 | | | |
| | $d_{19}$ = 1.6800 | $n_{11}$ = 1.77250 | $v_{11}$ = 49.60 |
| $r_{20}$ = −84.4506 | | | |
| | $d_{20}$ = $D_4$ (variable) | | |
| $r_{21}$ = ∞ (image surface) | | | |

Aspherical Surface Coefficients (12th Surface) $k=-0.8485$, $A_2=0$, $A_4=7.4293\times10^{-6}$ $A_6=1.2276\times10^{-7}$, $A_8=-1.9410\times10^{-11}$ $A_{10}=-2.0467\times10^{-11}$ (14th Surface) $k=-18.6612$, $A_2=0$, $A_4=3.1184\times10^{-6}$ $A_6=5.1849\times10^{-7}$, $A_8=3.1155\times10^{-9}$ $A_{10}=-7.6338\times10^{-12}$

| f | 39.33845 | 85.89193 | 192.41503 |
|---|---|---|---|
| $D_1$ | 3.60000 | 12.44329 | 20.17378 |
| $D_2$ | 0.50000 | 0.50000 | 0.50000 |
| $D_3$ | 15.43402 | 7.47062 | 2.41555 |
| $D_4$ | 6.02914 | 31.28139 | 83.65253 |

$fW$=39.3384, $fT$=192.415, $f1$=69.8198, $f2$=34.0092

$f3$=−18.581, $β2W$=0.39714, $β2T$=0.49245, $β3W$=1.4187

$β3T$=5.59621, $L(fW)$=59.7831, $L(fT)$=140.962

$vd(1R)$=81.54, $S(fW)$=53.7539

$S(fT)$=57.3093, $H(G1)$=2.90859

$fT/fW$=4.89

$f1/fW$1.77, $f1/fT$=0.36, $f2/fT$=0.18

$f3/fT$=−0.10

$(\beta 3T)^2-(\beta 3T)^2\times(\beta 2T)^2$=23.7

$[S(fT)-S(fW)]/(fT-fW)$=0.023

$L(fT)/fT$=0.733, $L(fT)/(fT-fW)$=0.921

$H(G1)/fT$=0.0151, $(\beta 3T)^2/[F(T)\times 0.03]$=75.1

$[(1/Rb-1/Ra)/(N1-N2)]Y$=0.278(max),−0.060(min)

$K\approx 0.013$

---

Embodiment 10 f = 39.29010 ~ 80.99964 ~ 164.90506,
F / 4.95 ~ F / 7.56 ~ F / 12.88

$r_1$ = −46.4813
$d_1$ = 1.5000        $n_1$ = 1.84666    $\nu_1$ = 23.78
$r_2$ = −72.0162
$d_2$ = 0.1500
$r_3$ = 23.9772
$d_3$ = 3.8000        $n_2$ = 1.49700    $\nu_2$ = 81.54
$r_4$ = −290.6726
$d_4$ = $D_1$ (variable)
$r_5$ = −21.2421
$d_5$ = 1.4500        $n_3$ = 1.83400    $\nu_3$ = 37.16
$r_6$ = 11.5296
$d_6$ = 3.5500        $n_4$ = 1.72825    $\nu_4$ = 28.46
$r_7$ = 96.4682
$d_7$ = 0.1200
$r_8$ = 19.4334
$d_8$ = 3.8916        $n_5$ = 1.80809    $\nu_5$ = 22.76
$r_9$ = 15.9101
$d_9$ = 3.0000        $n_6$ = 1.51742    $\nu_6$ = 52.43
$r_{10}$ = −63.2316
$d_{10}$ = 0.1500
$r_{11}$ = 28.6858
$d_{11}$ = 2.4500     $n_7$ = 1.51633    $\nu_7$ = 64.14
$r_{12}$ = −20.4382 (aspherical surface)
$d_{12}$ = $D_2$ (variable)
$r_{13}$ = ∞ (stop)
$d_{13}$ = $D_3$ (variable)
$r_{14}$ = −19.3623 (aspherical surface)
$d_{14}$ = 0.1500     $n_8$ = 1.52288    $\nu_8$ = 52.50
$r_{15}$ = −28.3069
$d_{15}$ = 2.3000     $n_9$ = 1.80809    $\nu_9$ = 22.76
$r_{16}$ = −18.3891
$d_{16}$ = 3.2463
$r_{17}$ = −9.7000
$d_{17}$ = 1.6000     $n_{10}$ = 1.72916  $\nu_{10}$ = 54.68
$r_{18}$ = −59.3087
$d_{18}$ = $D_4$ (variable)
$r_{19}$ = ∞ (image surface)

Aspherical Surface Coefficients (12th Surface) $k$=−0.7080, $A_2$=0, $A_4$=4.9153×10$^{-5}$ $A_6$=−1.4374×10$^{-8}$, $A_8$=8.6252×10$^{-11}$ $A_{10}$=9.4428×10$^{-11}$ (14th Surface) $k$=−10.9468, $A_2$=0, $A_4$=−7.3774×10$^{-5}$ $A_6$=2.4231×10$^{-6}$, $A_8$=−1.4086×10$^{-8}$ $A_{10}$=1.2143×10$^{-10}$

| f   | 39.29010 | 80.99964 | 164.90506 |
|-----|----------|----------|-----------|
| $D_1$ | 3.42140 | 12.38821 | 16.45077 |
| $D_2$ | 0.50000 | 0.50000 | 0.50000 |
| $D_3$ | 14.55169 | 7.39524 | 3.27562 |
| $D_4$ | 8.39751 | 31.47837 | 78.28210 |

$fW$=39.2901, $fT$=164.905, $f1$=60.8189, $f2$=31.4554

$f3$=−18.392, $\beta 2W$=0.41955, $\beta 2T$=0.5078, $\beta 3W$=1.53977, $\beta 3T$=5.33948, $L(fW)$=54.2285

$L(fT)$=125.866

$\nu d(1R)$=81.54, $S(fW)$=45.831

$S(fT)$=47.5843, $H(G1)$=2.14819

$fT/fW$=4.20

$f/fW$=1.55, $f1/fT$=0.37, $f2/fT$=0.19

$f3/fT$=−0.11

$(\beta 3T)^2-(\beta 3T)^2\times(\beta 2T)^2$=21.2

$[S(fT)-S(fW)]/fT-fW$=0.014

$L(fT)/fT$=0.763, $L(fT)/(fT-fW)$=1.002

$H(G1)/fT$=0.0130

$(\beta 3T)^2/[F(T)\times 0.03]$=73.86

$[(1/Rb-1/Ra)/(N1-N2)]Y$=0.305(max),−0.071(min)

$K\approx 0.013$

---

Embodiment 11 f = 39.31940 ~ 80.13121 ~ 137.03257,
F / 4.96 ~ F / 8.10 ~ F / 11.60

$r_1$ = −36.1260
$d_1$ = 1.2000        $n_1$ = 1.84666    $\nu_1$ = 23.78
$r_2$ = −54.4470
$d_2$ = 0.2000
$r_3$ = 25.5170
$d_3$ = 2.4505        $n_2$ = 1.49700    $\nu_2$ = 81.54
$r_4$ = −133.2280
$d_4$ = $D_1$ (variable)
$r_5$ = ∞ (stop)
$d_5$ = 2.0000
$r_6$ = −16.9530
$d_6$ = 1.0000        $n_3$ = 1.77250    $\nu_3$ = 49.60
$r_7$ = 8.7540
$d_7$ = 3.3498        $n_4$ = 1.69895    $\nu_4$ = 30.13
$r_8$ = −73.0910
$d_8$ = 0.2000
$r_9$ = 28.8310
$d_9$ = 3.1237        $n_5$ = 1.58913    $\nu_5$ = 61.28
$r_{10}$ = −19.3440 (aspherical surface)
$d_{10}$ = 0.7122
$r_{11}$ = −26.5170
$d_{11}$ = 1.0000     $n_6$ = 1.80518    $\nu_6$ = 25.42
$r_{12}$ = 26.5170
$d_{12}$ = 3.6300     $n_7$ = 1.69680    $\nu_7$ = 55.53
$r_{13}$ = −14.7050
$d_{13}$ = $D_2$ (variable)
$r_{14}$ = −38.4185 (aspherical surface)
$d_{14}$ = 0.2500     $n_8$ = 1.53416    $\nu_8$ = 40.99
$r_{15}$ = −47.4950
$d_{15}$ = 1.3000     $n_9$ = 1.77250    $\nu_9$ = 49.60
$r_{16}$ = 47.4950
$d_{16}$ = 0.1000
$r_{17}$ = 33.3930
$d_{17}$ = 3.5590     $n_{10}$ = 1.80518  $\nu_{10}$ = 25.42
$r_{18}$ = −194.3820
$d_{18}$ = 4.5556
$r_{19}$ = −14.6520
$d_{19}$ = 1.5000     $n_{11}$ = 1.69680  $\nu_{11}$ = 55.53
$r_{20}$ = −493.1840
$d_{20}$ = $D_3$ (variable)
$r_{21}$ = ∞ (image surface)

Aspherical Surface Coefficients (10th Surface) $k=-0.0859$, $A_2=0$, $A_4=7.1654 \times 10^{-5}$ $A_6=2.9034 \times 10^{-7}$, $A_8=-2.2409 \times 10^{-9}$ $A_{10}=-1.9366 \times 10^{-10}$ (14th Surface) $k=-4.9241$, $A_2=0$, $A_4=3.2424 \times 10^{-5}$ $A_6=8.8177 \times 10^{-8}$, $A_8=-1.2634 \times 10^{-9}$ $A_{10}=1.4913 \times 10^{-11}$

| f | 39.31940 | 80.13121 | 137.03257 |
|---|---|---|---|
| $D_1$ | 3.69700 | 12.56900 | 18.74777 |
| $D_2$ | 12.35743 | 5.79601 | 2.20674 |
| $D_3$ | 8.28699 | 30.85587 | 58.84557 |

$fW=39.319$, $fT=137.03$, $f1=63$, $f2=29.424$ $f3=-17.89$, $\beta 2W=0.3937$, $\beta 2T=0.493$, $\beta 3W=1.5852$, $\beta 3T=4.4119$, $L(fW)=54.472$ $L(fT)=109.93$ $\nu d(1R)=81.54$, $S(fW)=46.185$ $S(fT)=51.085$, $H(G1)=2.2506$ $fT/fW=3.49$ $f1/fW=1.60$, $f1/fT=0.46$, $f2/fT=0.21$ $f3/fT=-0.13$ $(\beta 3T)^2-(\beta 3T)^2 \times (\beta 2T)^2=14.7$ $[S(fT)-S(fW)]/(fT-fW)=0.050$ $L(fT)fT=0.802$, $L(fT)/(fT-fW)=1.125$ $H(G1)fT=0.0164$ $(\beta 3T)^2/[F(T) \times 0.0\ 3]=55.9$ $[(1/Rb-1/Ra)/(N1-N2)]Y=0.226$(max), $-0.020$(min)

$K \approx 0.004$

Embodiment 12 f = 39.34121 ~ 77.94504 ~ 154.51615,
F / 4.84 ~ F / 7.51 ~ F / 12.61

| | | | |
|---|---|---|---|
| $r_1 = -36.4108$ | | | |
| $d_1 = 1.5000$ | $n_1 = 1.84666$ | $\nu_1 = 23.78$ | |
| $r_2 = -56.5926$ | | | |
| $d_2 = 0.1500$ | | | |
| $r_3 = 29.0859$ | | | |
| $d_3 = 3.8000$ | $n_2 = 1.48749$ | $\nu_2 = 70.23$ | |
| $r_4 = -77.9135$ | | | |
| $d_4 = D_1$ (variable) | | | |
| $r_5 = -20.0548$ | | | |
| $d_5 = 1.5000$ | $n_3 = 1.83400$ | $\nu_3 = 37.16$ | |
| $r_6 = 14.2756$ | | | |
| $d_6 = 2.8500$ | $n_4 = 1.72825$ | $\nu_4 = 28.46$ | |
| $r_7 = -158.9545$ | | | |
| $d_7 = 0.1500$ | | | |
| $r_8 = 22.6216$ | | | |
| $d_8 = 5.6315$ | $n_5 = 1.80809$ | $\nu_5 = 22.76$ | |
| $r_9 = 15.9458$ | | | |
| $d_9 = 2.9000$ | $n_6 = 1.51742$ | $\nu_6 = 52.43$ | |
| $r_{10} = -29.4439$ | | | |
| $d_{10} = 0.1500$ | | | |
| $r_{11} = 55.4112$ | | | |
| $d_{11} = 2.2000$ | $n_7 = 1.51633$ | $\nu_7 = 64.14$ | |

-continued

Embodiment 12

| | | | |
|---|---|---|---|
| $r_{12} = -26.3943$ (aspherical surface) | | | |
| $d_{12} = D_2$ (variable) | | | |
| $r_{13} = \infty$ (stop) | | | |
| $d_{13} = D_3$ (variable) | | | |
| $r_{14} = -47.0444$ (aspherical surface) | | | |
| $d_{14} = 1.6000$ | $n_8 = 1.80100$ | $\nu_8 = 34.97$ | |
| $r_{15} = 63.2540$ | | | |
| $d_{15} = 0.2900$ | | | |
| $r_{16} = 46.5210$ | | | |
| $d_{16} = 2.8000$ | $n_9 = 1.80809$ | $\nu_9 = 22.76$ | |
| $r_{17} = -103.2100$ | | | |
| $d_{17} = 4.7038$ | | | |
| $r_{18} = -11.1087$ | | | |
| $d_{18} = 1.6800$ | $n_{10} = 1.69680$ | $\nu_{10} = 55.53$ | |
| $r_{19} = -55.0157$ | | | |
| $d_{19} = D_4$ (variable) | | | |
| $r_{20} = \infty$ (image surface) | | | |

Aspherical Surface Coefficients (12th Surface) $k=-0.7930$, $A_2=0$, $A_4=2.2146 \times 10^{-5}$ $A_6=1.7367 \times 10^{-7}$, $A_8=-3.1388 \times 10^{-9}$ $A_{10}=-4.0872 \times 10^{-11}$ (14th Surface) $k=-18.4524$, $A_2=0$, $A_4=2.4464 \times 10^{-5}$ $A_6=1.3026 \times 10^{-7}$, $A_8=4.4800 \times 10^{-9}$ $A_{10}=-2.6832 \times 10^{-11}$

| f | 39.34121 | 77.94504 | 154.51615 |
|---|---|---|---|
| $D_1$ | 2.50000 | 12.16724 | 17.11258 |
| $D_2$ | 0.5000 | 0.50000 | 0.50000 |
| $D_3$ | 13.65201 | 6.85601 | 2.68979 |
| $D_4$ | 6.77765 | 27.02242 | 67.09830 |

$fW=39.341$, $fT=154.52$, $f1=65.255$, $f2=33.364$ $f3=-17.8$, $\beta 2W=0.3989$, $\beta 2T=0.4833$, $\beta 3W=1.5115$, $\beta 3T=4.8995$, $L(fW)=55.335$, $L(fT)=119.31$ $\nu d(1R)=70.23$, $S(fW)=48.557$ $S(fT)=52.208$, $H(G1)=3.2491$ $fT/fW=3.93$ $f1/fW=1.66$, $f1/fT=0.42$, $f2/fT=0.22$ $f3/fT=-0.12$ $(\beta 3T)^2-(\beta 3T)^2 \times (\beta 2T)^2=18.4$ $[S(fT)-S(fW)]/(fT-fW)=0.032$ $L(fT)fT=0.7721$, $L(fT)/(fT-fW)=1.036$ $H(G1)/fT=0.021$ $(\beta 3T)^2 F(T) \times 0.03=63.4$ wherein reference symbols $r_1, r_2, \ldots$ represent radii of curvature on respective lens surfaces, reference symbols $d_1, d_2, \ldots$ designate thicknesses of respective lens elements and airspaces reserved therebetween, reference symbols $n_1, n_2, \ldots$ denote refractive indices of the respective lens elements, and reference symbols $\nu_1, \nu_2, \ldots$ represent Abbe's number of the respective lens elements. In addition lengths such as $r_1, r_2, \ldots, d_1, d_2, \ldots$ in the numerical data are expressed in a unit of mm.

The first embodiment has a composition illustrated in FIG. 1 and comprises a first positive lens unit G1, a second positive lens unit G2 and a third negative lens unit G3.

The first lens unit G1 of this optical system consists of a negative meniscus lens element ($r_1$ to $r_2$) having a concave surface on the object side and a positive lens element ($r_3$ to $r_4$) which has curvature on an object side surface higher than that on an image side surface.

The second lens unit G2 consists of a cemented lens component ($r_6$ through $r_8$) consisting of a negative lens element and a positive lens element, a positive lens element ($r_9$ to $r_{10}$), and a cemented lens component ($r_{11}$ through $r_{13}$) consisting of a negative lens element and a positive lens element.

Furthermore, the third lens unit G3 consists of a biconcave lens element ($r_{15}$, to $r_{16}$), a positive lens element ($r_{17}$, to $r_{18}$) which has curvature on an object side convex surface higher than that on an image side surface and a negative lens element ($r_{19}$ to $r_{20}$) which has curvature on an object side concave surface higher than that on an image side surface.

In the first embodiment, the most object side biconcave lens element of the third lens unit G3 is configured as a composite lens element which has a resin film having an aspherical surface $r_{14}$ disposed on the object side surface of the lens element.

Furthermore, an aperture stop S is disposed between the first lens unit G1 and the second lens unit G2.

The first embodiment satisfies the conditions (1), (2), (2A), (3), (3A) and (4) through (8).

The second through fifth embodiment have compositions shown in FIG. 2 through FIG. 5 respectively, each comprising a first lens unit G1 having positive refractive power, a second lens unit G2 having positive refractive power and a third lens unit G3 having negative refractive power.

In each of zoom optical systems according to these second through fifth embodiments, the first lens unit G1, the second lens unit G2 and the third lens unit G3 have compositions similar to those of the first, second and third lens units in the first embodiment.

Furthermore, an aperture stop S is disposed between the first lens unit G1 and the second lens unit G2 as in the first embodiment.

Furthermore, a most object side lens element of the third lens unit G3 is configured as an aspherical composite lens element as in the first embodiment.

Each of these second through fifth embodiments satisfies the conditions (1), (2), (2A), (3), (3A) and (4) through (8). In addition, each of the third, fourth and fifth embodiments also satisfies the condition (9).

The sixth embodiment is a zoom optical system which has a composition shown in FIG. 6 comprising, in order from the object side, first lens unit G1 having positive refractive power, a second lens unit G2 having positive refractive power and a third lens unit having negative refractive power.

Different from the first through fifth embodiment, the sixth embodiment uses the second lens unit G2 which consists of two cemented lens components each consisting of a negative lens element and a positive lens element, and an aperture stop S which is disposed in the second lens unit G2, that is, between an object side cemented lens component ($r_5$ through $r_7$) and an image side cemented lens component ($r_9$ through $r_{11}$).

Furthermore, the sixth embodiment satisfies the conditions (1), (2), (2A), (3), (3A) and (4) through (8).

Figure 7:
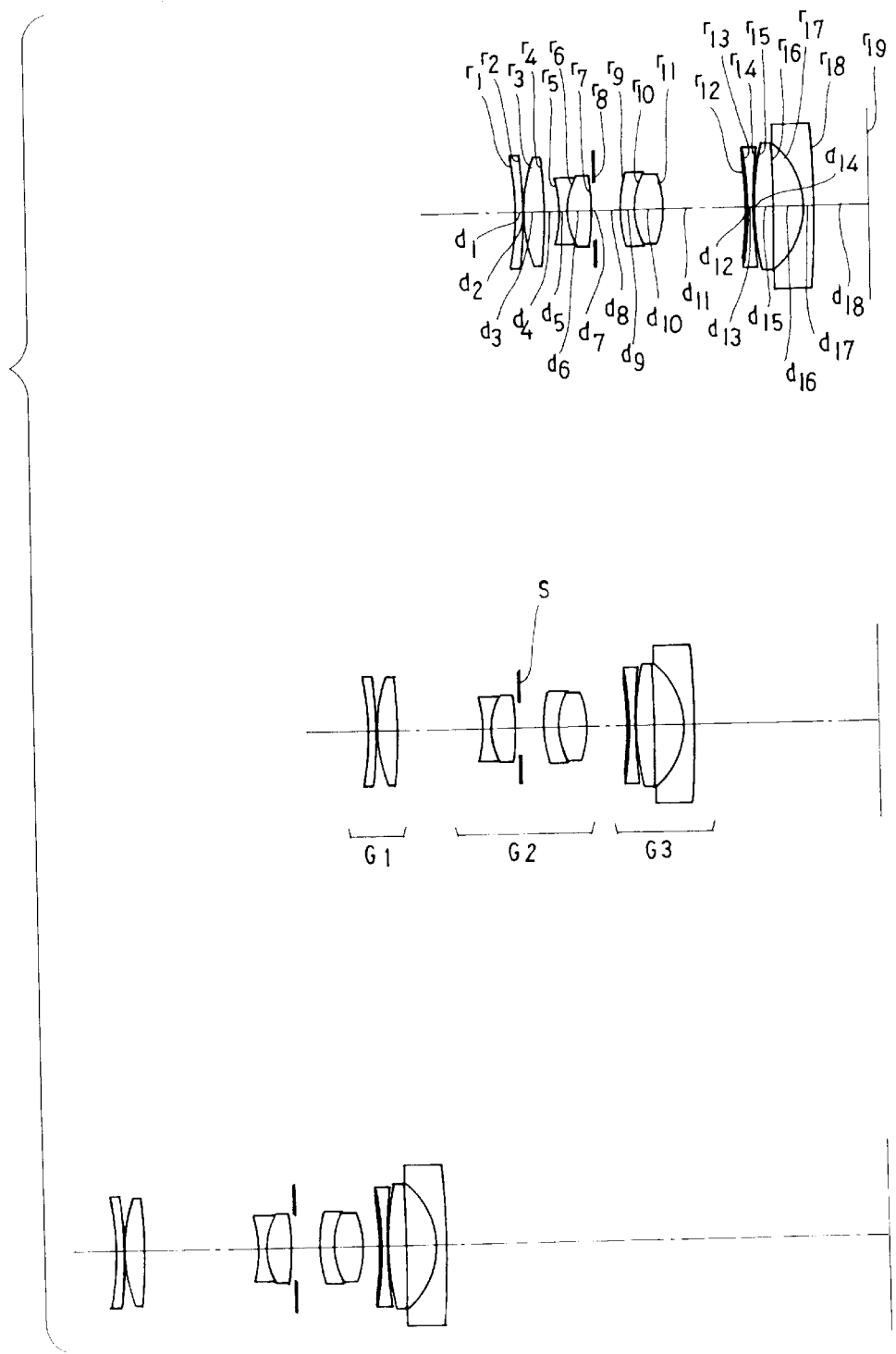

A zoom optical system according to the seventh embodiment of the present invention has a composition shown in FIG. 7, comprises, in order from the object side, a first lens unit G1 having positive refractive power, a second lens unit G2 having positive refractive power and a third lens unit G3 having negative refractive power and is similar in the composition to the sixth embodiment or uses the first, second and third lens units G1, G2 and G3 which are similar to those in the sixth embodiment, an object side lens element of the third lens unit G3 which is configured as an aspherical composite lens element and an aperture stop S which is disposed in the second lens unit G2.

The seventh embodiment satisfies the conditions (1), (2), (2A), (3), (3A) and (4) through (8).

Figure 8:
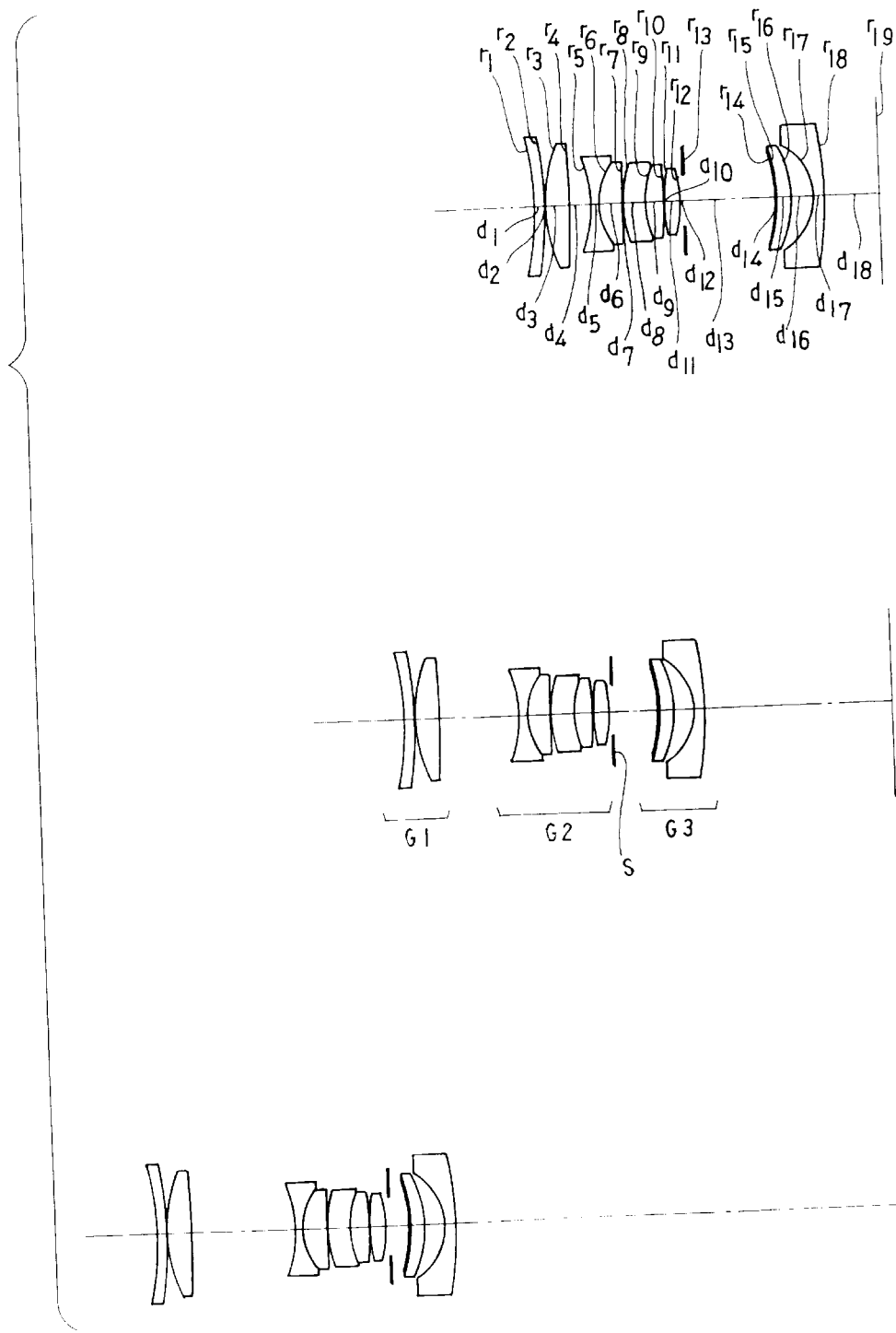

The eighth embodiment of the present invention has a composition shown in FIG. 8, and comprises a first lens unit G1 having positive refractive power, a second lens unit G2 having positive refractive power and a third lens unit having negative refractive power.

Though the first lens unit G1 has a composition which is the same as that of the first lens unit in each of the first through seventh embodiments, the second lens unit G2 consists of two cemented lens components ($r_5$ through $r_7$ and $r_8$ through $r_{10}$) each consisting of a negative lens element and a positive lens element and a positive lens element ($r_{11}$ to $r_{12}$), and the third lens unit G3 consists of a positive meniscus lens element ($r_{15}$ to $r_{16}$) having a concave surface on the object side and a negative lens element ($r_{17}$ to $r_{18}$) which has curvature on an object side surface higher than that on an image side surface.

Furthermore, the object side positive meniscus lens element of the third lens unit G3 is configured as an aspherical composite lens element which has a resin film having an aspherical surface $r_{14}$ disposed on a concave surface $r_{15}$ of the lens element.

Furthermore, an aperture stop is disposed between the second lens unit G2 and the third lens unit G3.

The zoom optical system according to the eighth embodiment satisfies the conditions (1), (2), (2A), (3), (3A) and (4) through (8).

Figure 9:
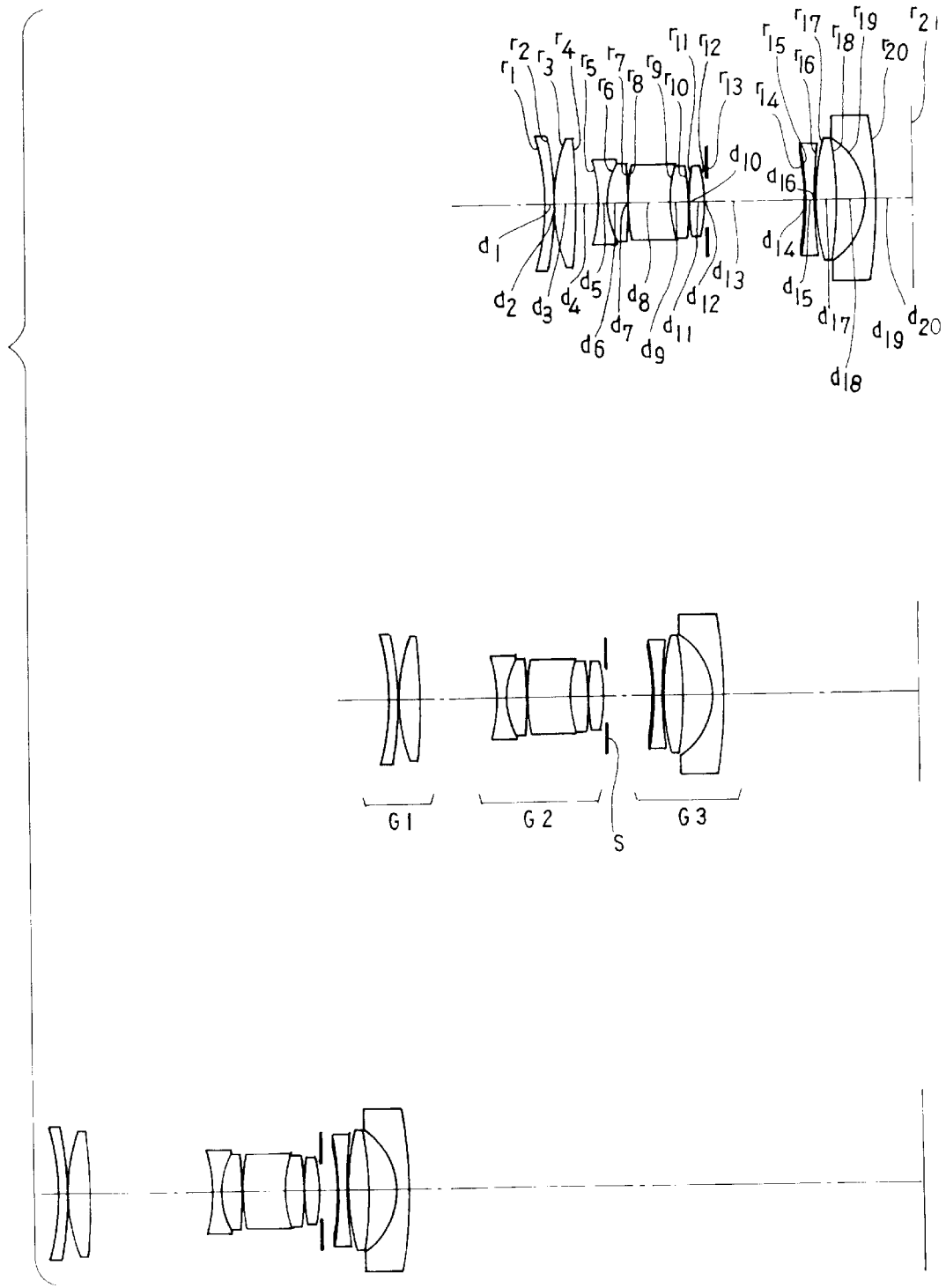

The ninth embodiment comprises, in order from the object side, a first lens unit G1 having positive refractive power, a second lens unit having positive refractive power and a third lens unit G3 having negative refractive power as shown in FIG. 9.

Though the first lens unit G1 and the second lens unit G2 have compositions similar to those of the first lens unit and the second lens unit of the eighth embodiment, the third lens unit G3 has a composition similar to that of the third lens unit in the first embodiment or the like.

In this ninth embodiment, a most object side biconcave lens element ($r_{15}$ to $r_{16}$) of the third lens unit G3 is configured as an aspherical composite lens element which has a resin film having an aspherical surface $r_{14}$ disposed on an object side surface $r_{15}$ of the lens element, and an aperture stop S is disposed between the second lens unit G2 and the third lens unit G3.

The optical system according to this ninth embodiment satisfies the conditions (1), (2), (2A), (3), (3A) and (4) through (8).

Figure 10:
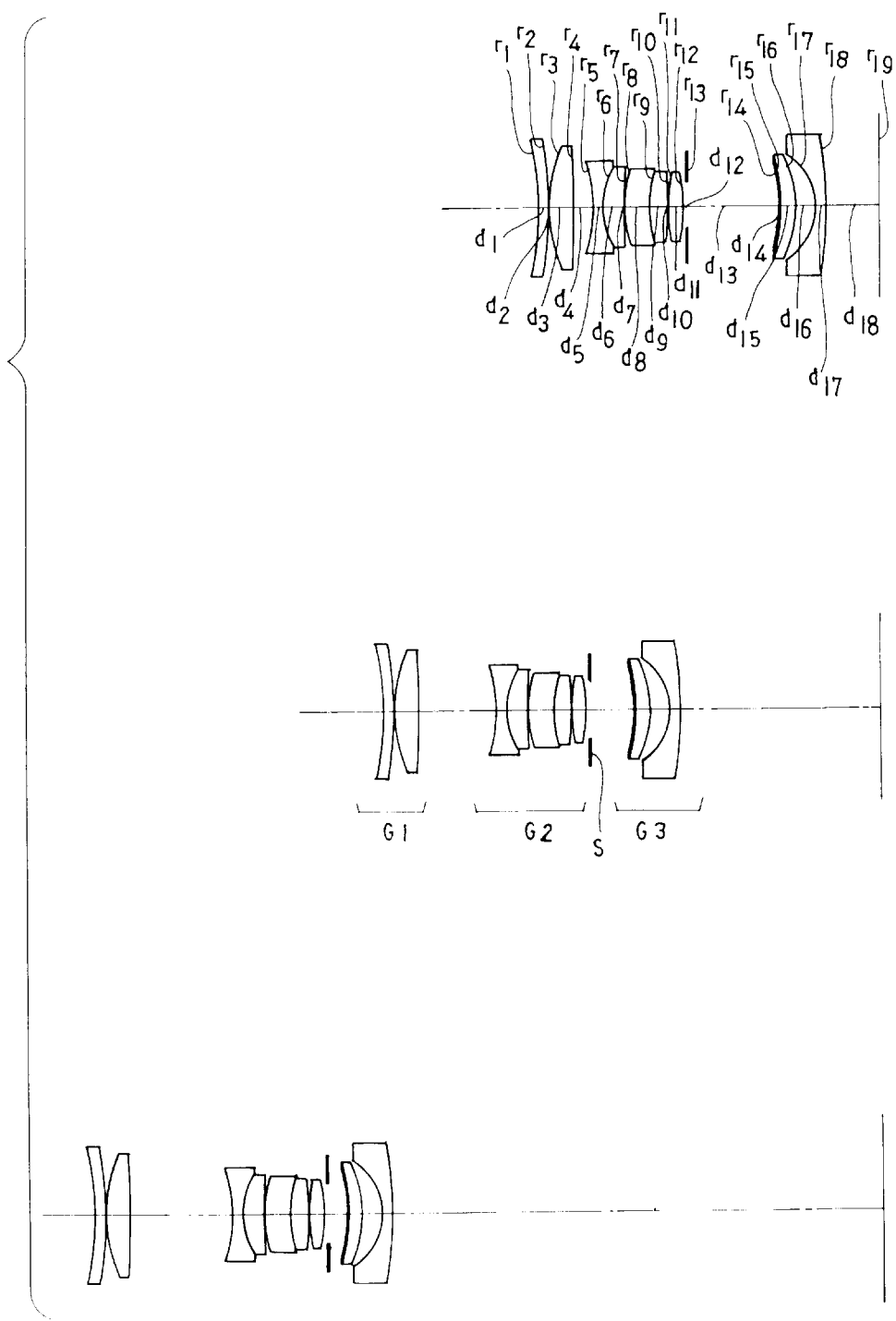

The tenth embodiment has a composition shown in FIG. 10 and comprises, in order from the object side, a first lens unit G1 having positive refractive power, a second lens unit G2 having positive refractive power and a third lens unit having negative refractive power.

The first, second and third lens units G1, G2 and G3 have compositions similar to those of the first, second and third lens units in the eighth embodiment, and an object side lens element ($r_{15}$ to $r_{16}$) of the third lens unit G3 is configured as an aspherical composite lens element which has a resin film having an aspherical surface $r_{14}$ formed on an object side concave surface $r_{15}$ of this lens element.

The optical system according to this tenth embodiment satisfies the conditions (1), (2), (2A), (3), (3A) and (4) and (8).

Figure 11:
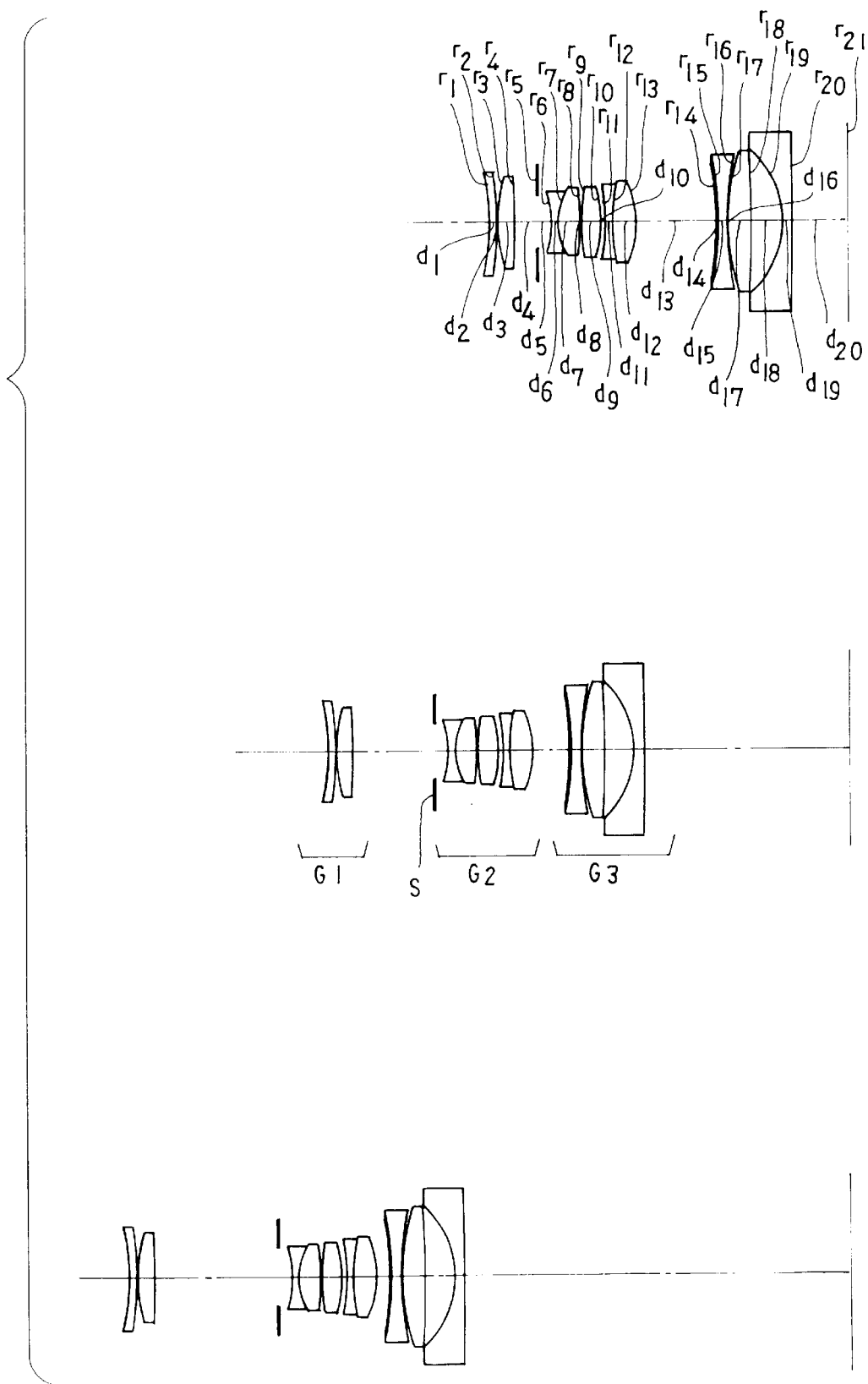

An optical system according to the eleventh embodiment comprises, in order from the object side, a first lens unit G1 having positive refractive power, a second lens unit G2 having positive refractive power and a third lens unit G3 having negative refractive power as shown in FIG. 11.

In the eleventh embodiment, the first lens unit G1 and the third lens unit G3 have compositions similar to those of the first lens unit and the third lens unit of the first embodiment or the like, whereas the second lens unit G2 consists of two cemented lens components ($r_5$ through $r_7$) and ($r_8$ through $r_{10}$) each consisting of a negative lens element and a positive lens element, and a positive lens element ($r_{11}$ to $r_{12}$) disposed on the image side of the cemented lens components. In the eleventh embodiment, a biconcave lens element disposed on the most object side in the third lens unit G3 is configured as an aspherical composite lens element which has a resin film having an aspherical surface $r_{14}$ on an object side concave surface $r_{15}$ of the lens element.

Furthermore, an aperture stop S is disposed between the second lens unit G2 and the third lens unit G3 in the eleventh embodiment.

The zoom optical system according to the eleventh embodiment satisfies the conditions (1) through (10).

Figure 12:
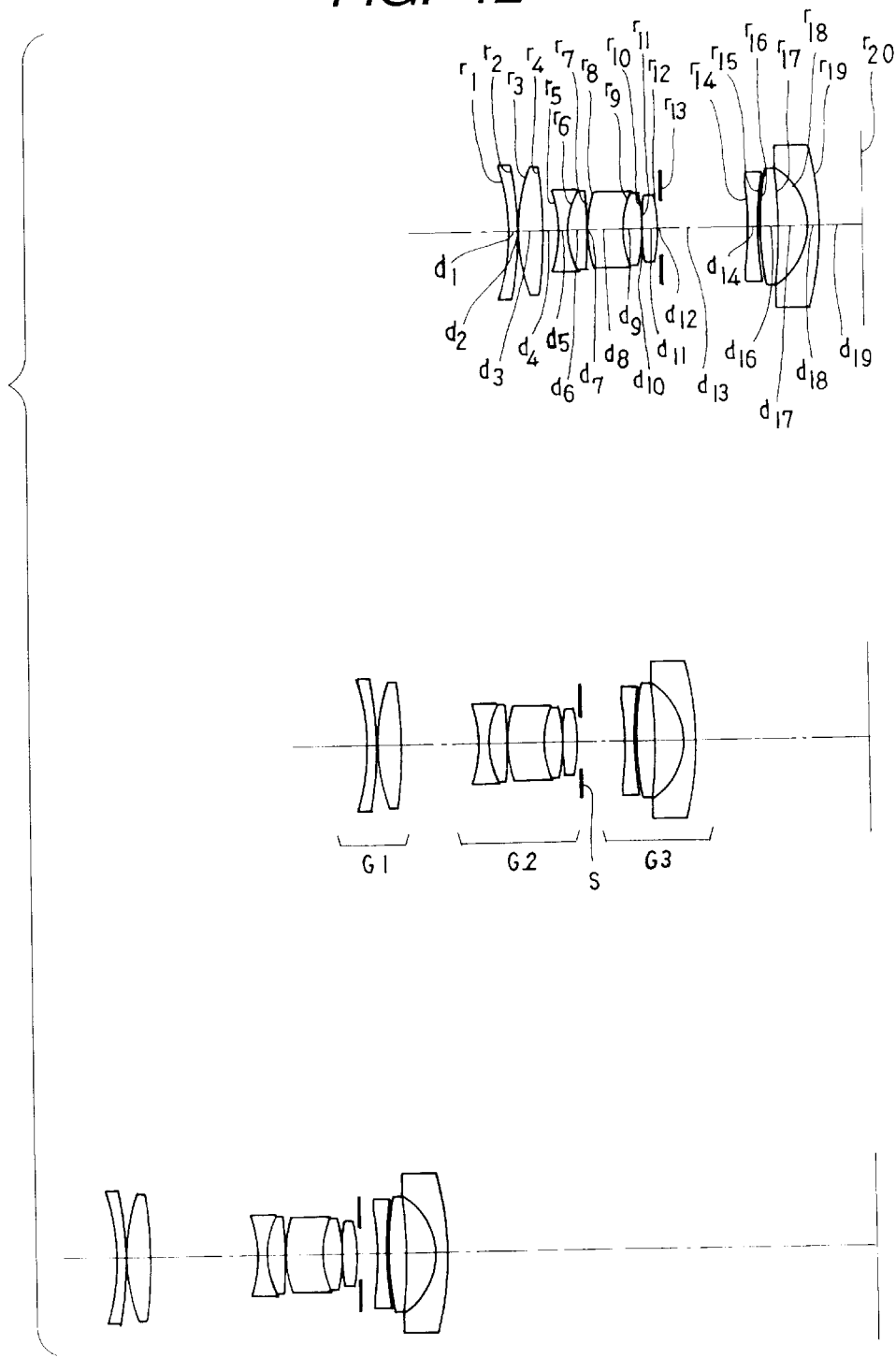

The twelfth embodiment has a composition shown in FIG. 12 and comprises, in order from the object side, a first lens unit G1 having positive refractive power, a second lens unit having positive refractive power and a third lens unit having negative refractive power.

The twelfth embodiment is similar to the ninth embodiment or the like in compositions of the first, second and third lens units G1, G2 and G3 and the like, but is different in that the twelfth embodiment uses no composite lens element.

The zoom optical system according to the twelfth embodiment satisfies the conditions (1), (2), (2A), (3), (3A) and (4) through (7).

In the sectional views illustrating the compositions of the above described embodiments, an upper stage corresponds to the wide position, a middle stage corresponds to an intermediate focal length and a lower stage corresponds to the tele position.

The zoom optical system according to each of the embodiments of the present invention can be focused from an object located at infinite distance onto an object located as a short distance by moving only the second lens unit on the object side or moving only the third lens unit on the image side. Furthermore, the zoom optical system can be focused from the object located at the infinite distance onto the object located at the short distance by moving the second lens unit on the object side and simultaneously moving the third lens unit on the image side.

When the tenth embodiment is focused on an object distance of 80 cm by moving the first lens unit and the second lens unit on the object side and moving the third lens unit on the image side, for example, an airspace between the first lens unit and the second lens unit and an airspace between the second lens unit and the third lens unit are set as listed below:

Wide position (f=39.2901)
Airspace between first lens unit G1 and second lens unit G2 2.94
Airspace between second lens unit G2 and third lens unit G3 16.29
Back focal length fB 6.66
Intermediate focal length (f=80.9996)
Airspace between first lens unit G1 and second lens unit G2 11.73
Airspace between second lens unit G2 and third lens unit G3 89.89
Back focal length fB 29.29
Tele position (f=164.9051)
Airspace between first lens unit G1 and second lens unit G2 15.54
Airspace between second lens unit G2 and third lens unit G3 4.94
Back focal length fB 72.62

Shapes of the aspherical surfaces used in the zoom optical systems according to the present invention are expressed by the following formula:

$$x = \frac{y^2/r}{1+\sqrt{1-(1+k)(y/r)^2}} + A_2 y^2 + A_4 y^4 + A_6 y^6 + \ldots$$

wherein a direction of an optical axis is taken as the x axis and a direction perpendicular to the optical axis is taken as the y axis, a reference symbol r represents a radius of curvature on a reference sphere, and reference symbols $A_1, A_2, A_4$ and $A_6, \ldots$ designate aspherical surface coefficients.

Figure 13:
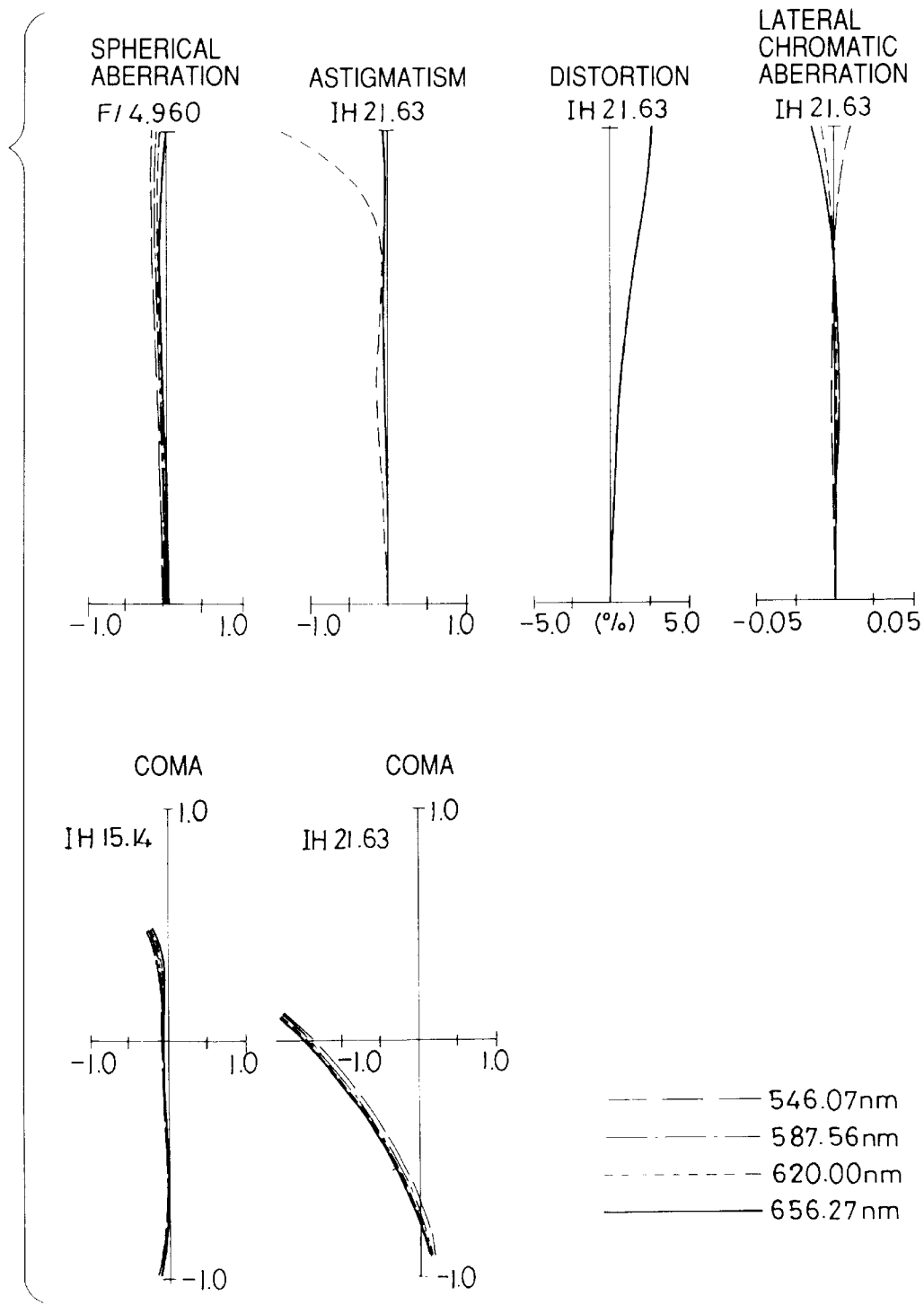
FIG. 13 shows curves visualizing aberration characteristics at a wide position of the first embodiment.
Figure 14:
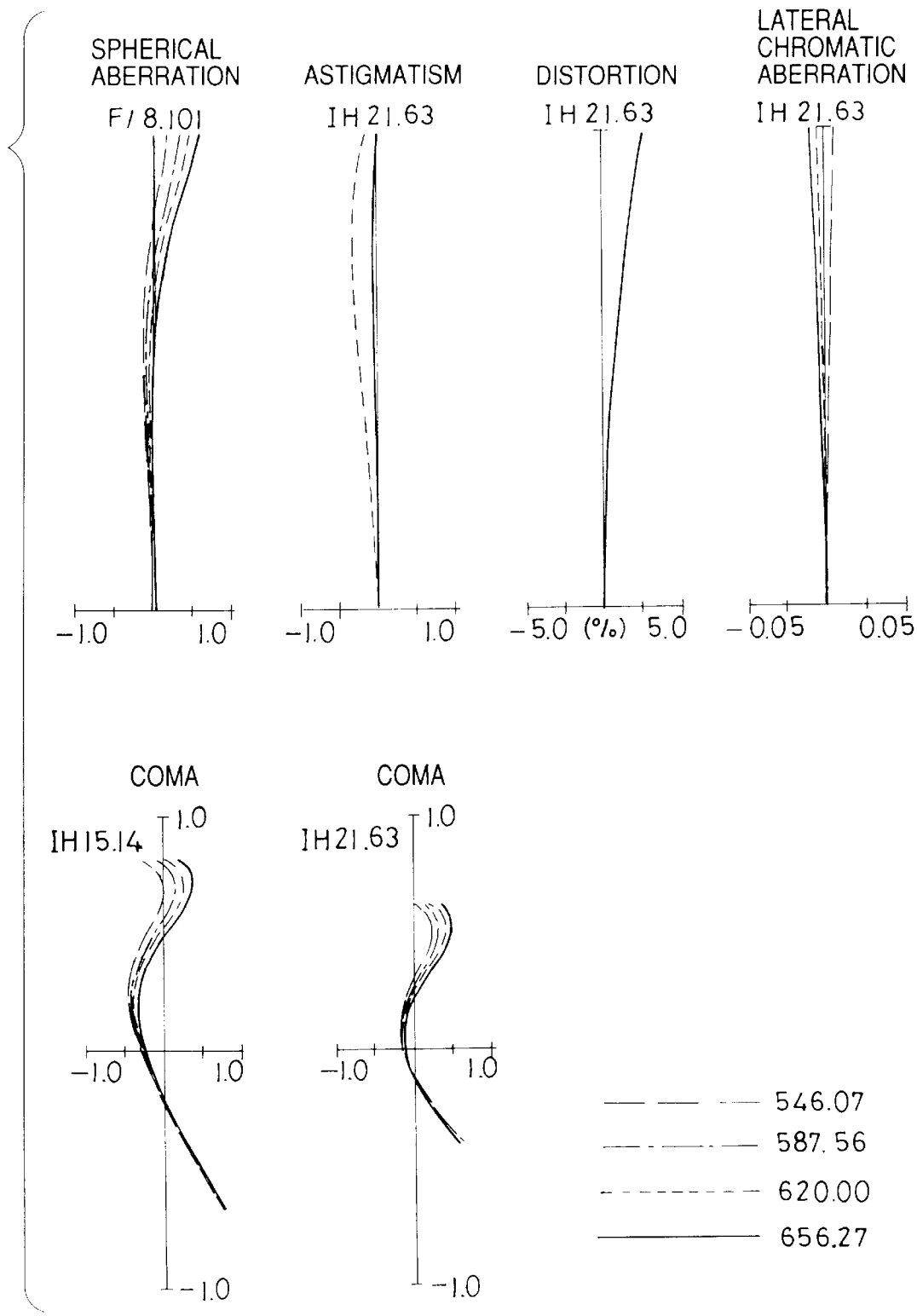
FIG. 14 shows curves visualizing aberration characteristics at an intermediate focal length of the first embodiment.
Figure 15:
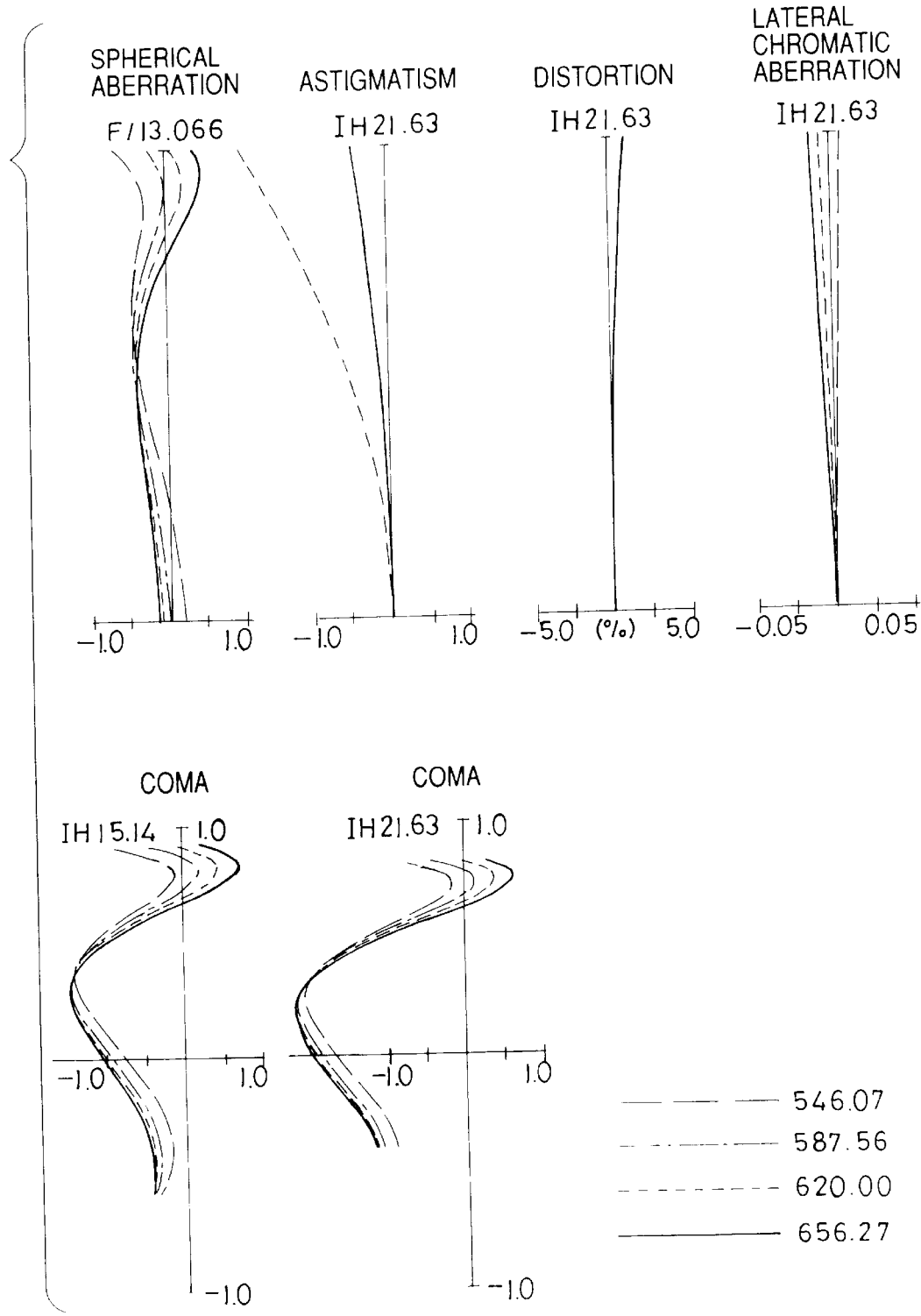
FIG. 15 shows curves visualizing aberration characteristics at a tele position of the first embodiment.

FIGS. 13, 14 and 15 are curves illustrating aberration characteristics of the first embodiment of the present invention when the zoom optical system is focused on an object located at infinite distance at the wide position, intermediate focal length and tele position respectively.

As seen from these curves, the zoom optical system according to the present invention corrects aberrations favorably and scarcely varies the aberrations by zooming.

Furthermore, the zoom optical system according to the second through twelfth embodiments favorably correct aberrations and scarcely vary the aberrations by zooming like the zoom optical system according to the first embodiment.

Figure 16:
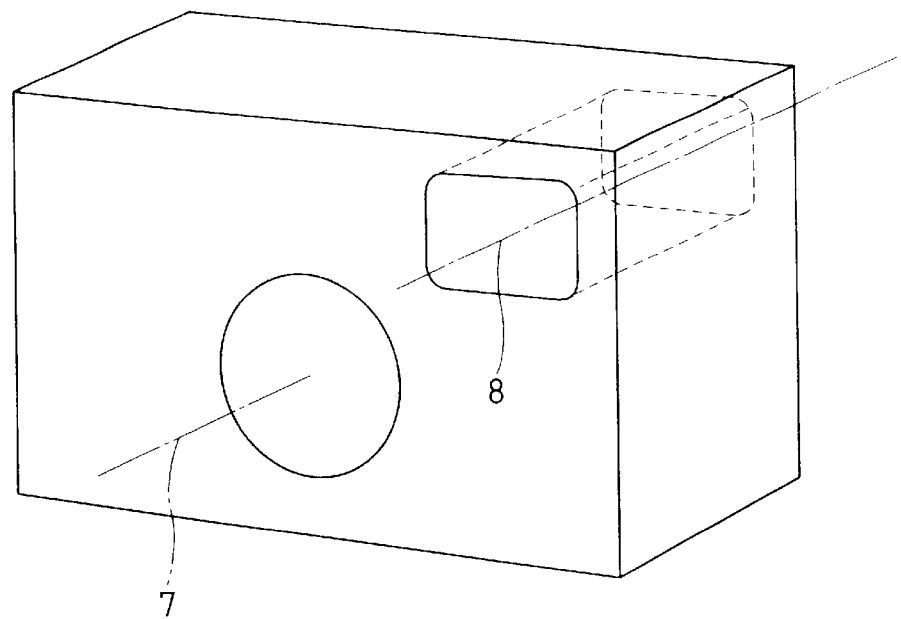
FIG. 16 is a perspective view of a compact camera which uses the zoom optical system according to the present invention.
Figure 17:
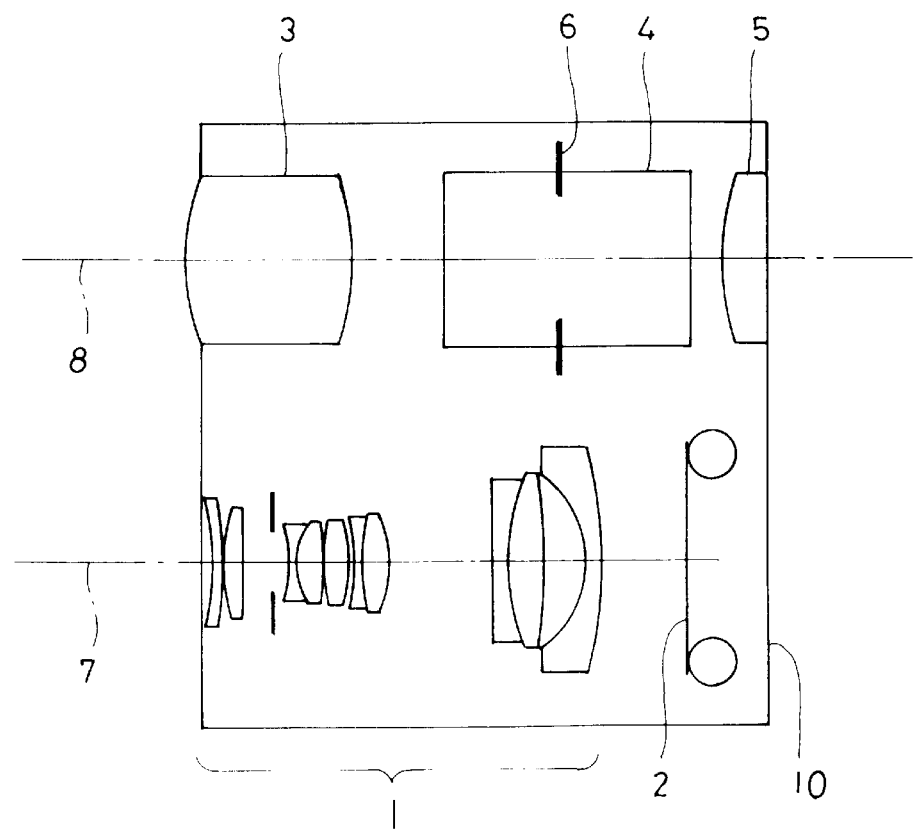
FIG. 17 is a sectional view of the compact camera which uses the zoom optical system according to the present invention.

FIG. 16 and 17 are diagrams a zoom lens system according to the present invention in a condition where the zoom lens system is built in a 35 mm camera as a photographic lens system for a compact camera: FIG. 16 being a perspective view and FIG. 17 being a sectional view.

In these drawings, a reference numeral 1 represents a condition of the wide position of the first embodiment of the zoom optical system according to the present invention which consists of the first lens unit G1, second lens unit G2 and third lens unit G3. A reference numeral 2 designates a film, a reference numeral 3 denotes a view finder objective lens, a reference numeral 4 represents an image erecting prism, a reference numeral 5 designates an eyepiece, a reference numeral 6 denotes a stop, and reference numerals 7 and 8 represent a photographing optical path and a view finder optical path. In addition, a reference numeral 10 designates a camera body.

This camera is configured so that the photographing optical path and the view finder optical path are nearly in parallel with each other, and an image of an object is observed through a view finder which is composed of the view finder objective lens 3, the image electing prism 4, the stop 6 and the eyepiece 5, and imaged photographed by a zoom optical system 1 according to the present invention. An electronic image pickup device such as a CCD may be used in place of the film.

The present invention makes it possible to realize a zoom optical system which has a short total length at a tele position and favorable imaging performance, allows optical performance to be scarcely lowered by zooming and has a high vari-focal ratio exceeding 3.8.

What is claimed is:

1. A zoom optical system comprising, in order from an object side: a first lens unit having positive refractive power; a second lens unit having positive refractive power; and a third lens unit having negative refractive power, wherein a magnification is changed from a wide position to a tele position by moving the lens units on the object side so as to widen an airspace between said first lens unit and said second lens unit and narrow an airspace between said second lens unit and said third lens unit, and wherein said zoom optical system satisfies the following conditions (1), (2), (3) and (4):

$$fT/fW > 3.8 \tag{1}$$

$$0 < [S(fTa) - S(fW)]/(fTa \cdot fW) < 0.2 \tag{2}$$

$$0.8 < L(fTa)/(fTa - fW) < 1.05 \tag{3}$$

$$0 < H(G1)/fTa < 0.023 \tag{4}$$

wherein reference symbols fT and fW represent focal length of the zoom optical system at the wide position and the tele position respectively, a reference symbol fTa designates an optical focal length in a focal length region exceeding 3.8 times of the focal length at the wide position, a reference symbol S(fW) denotes a distance as measured from a most object side surface to a most image side surface at the wide position, a reference symbol S(fTa) represents a distance as measured from a most object side surface to a most image side surface at the focal length of fTa, a reference symbol L(fTa) designates a distance as measured from the most object side surface to image at the focal length of fTa and a reference symbol H(G1) denotes a distance as measured from the most object side surface to a front principal point of the first lens unit G1.

2. A zoom optical system comprising, in order from an object side: a first lens unit having positive refractive power; a second lens unit having positive refractive power; and a third lens unit having negative refractive power, wherein a magnification is changed from a wide position to a tele position by moving the lens units on the object side so as to widen an airspace between said first lens unit and said second lens unit and narrow an airspace between said second lens unit and said third lens unit, wherein said first lens unit consists of two lens elements, in order from the object side, a negative meniscus lens element which has a concave surface on the object side and a positive lens element which has an absolute value of a radius of curvature on an object side surface smaller than an absolute value of a radius of curvature on an image side surface, wherein said third lens unit comprises, in order from the object side, a biconcave lens component, a positive lens component which has an absolute value of a radius of curvature on an object side surface smaller than an absolute value of a radius of curvature on an image side surface and a lens component which has an absolute value of a radius of curvature on an image side surface smaller than a absolute value of a radius of curvature on an object side surface, and wherein said zoom optical system satisfies the following conditions (2A) and (3A):

$$0 < [S(fT) - S(fW)]/(fT - fW) < 0.2 \tag{2A}$$

$$0.8 < L(fT)/(fT - fW) < 1.05 \tag{3A}$$

wherein reference symbols fW and fT represent focal lengths of the zoom optical system as a whole at the wide position and the tele position respectively, a reference symbol S(fW) designates a distance as measured from a most object side surface to a most image side surface at the wide position, a reference symbol S(fT) denotes a distance as measured from the most object side surface to the most image side surface at the tele position and a reference symbol L(fT) denotes a total length of the optical system at the tele position.

3. A zoom optical system comprising, in order from an object side: a first lens unit having positive refractive power; a second lens unit having positive refractive power; and a third lens unit having negative refractive power, wherein a magnification is changed from a wide position to a tele position by moving the lens units on the object side so as to widen an airspace between said first lens unit and said second lens unit and narrow an airspace between said second lens unit and said third lens unit, wherein said third lens unit comprises, in order from the object side, a biconcave lens component and, a positive lens component which has an absolute value of a radius of curvature on an object side surface smaller than an absolute value of a radius of curvature on an image side surface and a negative lens component which has an absolute value of a radius of curvature on an object side surface smaller than an absolute value of a radius of curvature on an image side surface, and wherein said zoom optical system satisfies the following condition (10):

$$(\beta 3T)^2 / [F(T) \times 0.03] < 60 \tag{10}$$

wherein a reference symbol $\beta 3T$ represents a magnification of the third lens unit at the tele position and a reference symbol F(T) designates an F number at the tele position.

4. A zoom optical system comprising, in order from an object side: a first lens unit having positive refractive power; a second lens unit having positive refractive power; and a third lens unit having negative refractive power, wherein a magnification is changed from a wide position to a tele position by moving the lens units on the object side so as to widen an airspace between said first lens unit and said second lens unit and narrow an airspace between said second lens unit and said third lens unit, and wherein said zoom optical system satisfies the following conditions (1), (4), (5) and (6):

$$fT/fW > 3.8 \tag{1}$$

$$0 < H(G1)/fTa < 0.023 \tag{4}$$

$$15 < (\beta 3T)^2 - (\beta 3T)^2 \times (\beta 2T)^2 < 27 \tag{5}$$

$$0.3 < f_1/fTa < 0.5 \tag{6}$$

wherein reference symbols fW and fT represent focal lengths of the optical system as a whole at the wide position and the tele position respectively, a reference symbol fTa designates an optional focal length in a focal length region exceeding 3.8 times of a focal length at the wide position, a reference symbol H(G1) denotes a distance as measured from a first surface to a front principal point of the first lens unit, a reference symbol f1 represents a focal length of the first lens unit, and reference symbols $\beta 2T$ and $\beta 3T$ designate magnifications of the second lens unit and the third lens unit respectively at the tele position.

5. The zoom optical system according to claim 1, 3 or 4, wherein said first lens unit consists of two lens elements, in order from the object side, a negative meniscus lens element having a concave surface on the object side and a positive lens element which has an absolute value of a radius of curvature on an object side surface smaller than an absolute value of a radius of curvature on an image side surface.

6. The zoom optical system according to claim 1 or 4, wherein said third lens unit comprises, in order from the object side, a biconcave lens component, a positive lens component which has an absolute value of a radius of curvature on an object side surface smaller than an absolute value of a radius of curvature as on an image side surface and a negative lens component which has an absolute value of a radius of curvature on an object side surface smaller than an absolute value of a radius of curvature on an image side surface.

7. The zoom optical system according to claim 2 or 3 satisfying the following condition (4A):

$$0<H(G1)/fT<0.023 \tag{4A}$$

wherein a reference symbol fT represents a focal length of the optical system as a whole at the tele position, a reference symbol H(G1) designate a distance as measured from a first surface to a front principal point of the first lens unit.

8. The zoom optical system according to claim 1, 2 or 3 satisfying the following condition (5):

$$15<(\beta 3T)^2-(\beta 3T)^2\times(\beta 2T)^2<27 \tag{5}$$

wherein reference symbols β2T and β3T represent magnifications of the second lens unit and the third lens unit respectively at the tele position.

9. The zoom optical system according to claim 1, 2, 3 or 4 satisfying the following condition (6A):

$$0.3<f_1/fT<0.5 \tag{6A}$$

wherein a reference symbol f1 represents a focal length of the first lens unit G1 and a reference symbol fT designates a focal length of the optical system and a whole at the tele position.

10. The zoom optical system according to claim 1, 2, 3 or 4, wherein said second lens unit comprises at least a cemented lens component consisting of a negative lens element and a positive lens element and has negative refractive power and a cemented lens component consisting of a negative lens element and a positive lens element and has positive refractive power.

11. The zoom optical system according to claim 1, 2, 3 or 4, wherein said third lens unit comprises an aspherical lens component on which an aspherical surface is formed by coating a concave surface of a spherical lens element with a thin resin film and wherein a shape of the aspherical surface of said aspherical lens component satisfies the following condition (7) over an entire effective surface:

$$-0.2<[(1/Rb-1/Ra)/(N1-N2)]Y<0.9 \tag{7}$$

wherein a reference symbol Ra represents a local radius of curvature on the aspherical surface at a height of Y as measured from an optical axis, that is, a distance of a normal to the aspherical surface at the height of Y from the optical axis as measured from the aspherical surface to an intersection of the normal with the optical axis, a reference symbol Rb designates a radius of curvature on the optical axis of the aspherical surface, and reference symbols N1 and N2 denote refractive indices on the object side and the image side respectively of the aspherical surface.

12. The zoom optical system according to claim 11, wherein the shape of the aspherical surface of said aspherical lens component satisfies, in place of the condition (7), the following condition (7-1) over the entire effective surface:

$$-0.1<[1/Rb-1/Ra]/(N1-N2)Y<0.4 \tag{7-1}$$

wherein a reference symbol Ra represents a local radius of curvature on the aspherical surface at a height of Y as measured from an optical axis, that is, a distance of a normal to the aspherical surface at the height of Y from the optical axis as measured from the aspherical surface to an intersection of the normal with the optical axis, a reference symbol Rb designates a radius of curvature on the optical axis of the aspherical surface, and reference symbols N1 and N2 denote refractive indices on the object side and the image side respectively of the aspherical surface.

13. The zoom optical system according to claim 2, wherein an Abbe's number $v_d(1R)$ of a positive lens element disposed on the most image side in said first lens unit satisfies the following condition (8):

$$v_d(1R)>81 \tag{8}$$

14. The zoom optical system according to claim 1, 3 or 4 wherein said first lens unit comprises a positive lens element on a most image side and an Abbe's number $v_d(1R)$ of said positive lens element satisfies the following condition (8):

$$v_d(1R)>81 \tag{8}$$

15. The zoom optical system according to claim 1, 2, 3 or 4, wherein said third lens unit comprises a lens element which has an aspherical surface and a resin film having an aspherical surface is disposed on said lens component having the aspherical surface.

16. The zoom optical system according to claim 15, wherein said resin film satisfies the following condition (9):

$$K<0.01 \tag{9}$$

wherein a reference symbol K represents a water absorption ratio of the resin film.

17. The zoom optical system according to claim 1, 2, 3 or 4, wherein an aperture stop is disposed between said first lens unit and said second lens unit.

18. The zoom optical system according to claim 1, 2, 3 or 4, wherein an aperture stop is disposed in said second lens unit.

19. The zoom optical system according to claim 1, 2, 3 or 4, wherein an aperture stop is disposed between said second lens unit and said third lens unit.

20. A camera comprising: a photographic optical system; and a view finder optical system arranged nearly in parallel with an optical path of said photographic optical system, wherein the zoom optical system according to claim 1, 2, 3 or 4 is used as said photographic optical system.

* * * * *